US012778022B2

(12) United States Patent
O'Connor et al.

(10) Patent No.: US 12,778,022 B2
(45) Date of Patent: Nov. 3, 2026

(54) HARVESTING MACHINE UNLOADING CONTROL SYSTEM WITH AUTOMATED CART PARAMETER LOCATOR

(71) Applicant: Deere & Company, Moline, IL (US)

(72) Inventors: Sara C. O'Connor, Clive, IA (US); Kellen E. O'Connor, Clive, IA (US); Jeremy J. Faust, Grimes, IA (US); Ryan R. White, Polk City, IA (US)

(73) Assignee: Deere & Company, Moline, IL (US)

( * ) Notice: Subject to any disclaimer, the term of this patent is extended or adjusted under 35 U.S.C. 154(b) by 249 days.

(21) Appl. No.: 18/334,886

(22) Filed: Jun. 14, 2023

(65) Prior Publication Data

US 2024/0138315 A1 May 2, 2024

Related U.S. Application Data

(60) Provisional application No. 63/381,187, filed on Oct. 27, 2022, provisional application No. 63/381,178, filed on Oct. 27, 2022.

(51) Int. Cl.
*A01D 41/00* (2006.01)
*A01D 41/127* (2006.01)
*A01D 90/10* (2006.01)

(52) U.S. Cl.
CPC ......... *A01D 90/105* (2013.01); *A01D 41/127* (2013.01)

(58) Field of Classification Search
CPC ............................ A01D 90/105; A01D 41/127
USPC ............................................................ 701/50
See application file for complete search history.

(56) References Cited

U.S. PATENT DOCUMENTS

| | | | |
|---|---|---|---|
| 5,575,316 | A | 11/1996 | Pollklas |
| 7,277,784 | B2 | 10/2007 | Weiss |
| 8,060,283 | B2 | 11/2011 | Mott et al. |
| 8,868,304 | B2 | 10/2014 | Bonefas |
| 9,119,342 | B2 | 9/2015 | Bonefas |
| 9,326,444 | B2 | 5/2016 | Bonefas |
| 9,642,305 | B2 | 5/2017 | Nykamp et al. |

(Continued)

FOREIGN PATENT DOCUMENTS

| | | | |
|---|---|---|---|
| CN | 108550141 | A | 9/2018 |
| DE | 102009027245 | A1 | 12/2010 |

(Continued)

OTHER PUBLICATIONS

Huang. Xiaoshui & Mei, Guofeng & Zhang, Jian & Abbas, Rana. (2021). A comprehensive survey on point cloud registration, Mar. 5, 2021, 17 pages. https://www.researchgate.net/publication/349787695_A_comprehensive_survey_on_point_cloud_registration.

(Continued)

*Primary Examiner* — Erin M Piateski
*Assistant Examiner* — Michael T Dowling
(74) *Attorney, Agent, or Firm* — Christopher J. Volkmann; KELLY, HOLT & CHRISTENSON PLLC

(57) ABSTRACT

A physical attribute of a receiving vehicle (a receiving vehicle parameter) is automatically detected by a sensor on a leading vehicle, and a calibration system locates (by calculating a calibrated offset value) the receiving vehicle parameter relative to a reference point on a following vehicle, the following vehicle providing propulsion to the receiving vehicle. The leading vehicle automatically unloads material into the receiving vehicle using the calibrated offset value corresponding to the receiving vehicle.

20 Claims, 15 Drawing Sheets

(56) References Cited

U.S. PATENT DOCUMENTS

| | | | |
|---|---|---|---|
| 9,861,040 | B2 | 1/2018 | Bonefas |
| 9,992,931 | B2 | 6/2018 | Bonefas et al. |
| 2008/0147282 | A1 | 6/2008 | Kormann |
| 2012/0215381 | A1 | 8/2012 | Wang et al. |
| 2012/0215394 | A1 | 8/2012 | Wang et al. |
| 2012/0215409 | A1 | 8/2012 | Wang et al. |
| 2013/0045067 | A1 | 2/2013 | Pickett et al. |
| 2013/0166157 | A1 | 6/2013 | Schleicher et al. |
| 2013/0213518 | A1 | 8/2013 | Bonefas |
| 2013/0231823 | A1 | 9/2013 | Wang et al. |
| 2014/0224377 | A1 | 8/2014 | Bonefas |
| 2014/0325422 | A1 | 10/2014 | Madsen et al. |
| 2015/0264866 | A1 | 9/2015 | Foster et al. |
| 2015/0366134 | A1 | 12/2015 | Dollinger et al. |
| 2016/0057921 | A1 | 3/2016 | Pickett et al. |
| 2017/0042088 | A1 | 2/2017 | Nykamp et al. |
| 2017/0055446 | A1 | 3/2017 | Nykamp et al. |
| 2018/0024549 | A1 | 1/2018 | Hurd |
| 2018/0058861 | A1 | 3/2018 | Doria et al. |
| 2020/0039306 | A1 | 2/2020 | Rogan |
| 2020/0128738 | A1 | 4/2020 | Suleman et al. |
| 2020/0132822 | A1 | 4/2020 | Pimentel et al. |
| 2020/0133262 | A1 | 4/2020 | Suleman et al. |
| 2020/0164803 | A1 | 5/2020 | Jales Costa et al. |
| 2020/0196526 | A1 | 6/2020 | Koch et al. |
| 2020/0319655 | A1 | 10/2020 | Desai et al. |
| 2021/0195840 | A1 | 7/2021 | Puryk et al. |
| 2021/0294337 | A1 | 9/2021 | Van Mill et al. |
| 2021/0329840 | A1 | 10/2021 | Craig |
| 2021/0337729 | A1 | 11/2021 | O'Connor et al. |
| 2022/0015288 | A1 | 1/2022 | Christiansen et al. |
| 2022/0015290 | A1 | 1/2022 | Yao et al. |
| 2022/0122197 | A1 | 4/2022 | Hanrieder |
| 2022/0197302 | A1 | 6/2022 | McClelland et al. |
| 2022/0204051 | A1 * | 6/2022 | Rands ............. B60W 60/00274 |
| 2022/0287239 | A1 | 9/2022 | Faust et al. |
| 2022/0410704 | A1 | 12/2022 | O'Connor et al. |
| 2023/0113645 | A1 | 4/2023 | Bilde et al. |
| 2023/0180659 | A1 | 6/2023 | Grieshop et al. |
| 2023/0281896 | A1 | 9/2023 | Christiansen et al. |
| 2023/0345856 | A1 | 11/2023 | Mahler et al. |
| 2023/0403969 | A1 | 12/2023 | Christiansen et al. |

FOREIGN PATENT DOCUMENTS

| | | | |
|---|---|---|---|
| DE | 102012211001 | A1 | 1/2014 |
| DE | 102015109799 | A1 | 12/2016 |
| DE | 102016214320 | A1 | 2/2017 |
| EP | 1219153 | A2 | 7/2002 |
| EP | 2044826 | A2 | 4/2009 |
| EP | 2245917 | A2 | 11/2010 |
| EP | 2995191 | A1 | 3/2016 |
| EP | 3316218 | A1 | 5/2018 |
| EP | 3815486 | A1 | 5/2021 |
| EP | 3949714 | A1 | 2/2022 |
| EP | 3955183 | A1 | 2/2022 |
| EP | 4056019 | A1 | 9/2022 |
| EP | 4062740 | A1 | 9/2022 |
| EP | 4070636 | A1 | 10/2022 |
| EP | 4101286 | A1 | 12/2022 |
| WO | WO 2022036114 | A1 | 2/2022 |

OTHER PUBLICATIONS

U.S. Appl. No. 18/465,580 Application and Drawings filed Sep. 12. 2023, 114 pages.

U.S. Appl. No. 18/447,718 Application and Drawings filed Aug. 10, 2023, 53 pages.

U.S. Appl. No. 18/358,401 Application and Drawings filed Jul. 25. 2023, 47 pages.

U.S. Appl. No. 18/352,576 Application and Drawings filed Jul. 14, 2023, 39 pages.

Autodesk, "Determine Volume of Solid", Oct. 16, 2019, 3 pages, <https://knowledge.autodesk.com/support/autocad/learn-explore/caas/sfdcarticles/sfdcarticles/Determine-volume-of-solid.html#:~:text=To%20determine%20the%20volume%20of%20a%20solid%20object%2C%20use%20the,Press%20ENTER>.

Stanley, Nick, Solidworks Calculating Volume of a Solid. GoEngineer. 6 pages, Feb. 3, 2022. Retrieved from the Internet: <https://www.goengineer.com/blog/solidworks-calculating-volume-of-a-solid>.

U.S. Appl. No. 63/381,178 Application and Drawings filed Oct. 27, 2022, 101 pages.

U.S. Appl. No. 63/381,187 Application and Drawings filed Oct. 27, 2022, 104 pages.

U.S. Appl. No. 63/512,368 Application and Drawings filed Jul. 7, 2023, 101 pages.

Tesla Motors Club Community Thread entitled "Lane change notification" 4 pages, originally posted Dec. 29, 2021 by user "Horvin" Retrieved from internet: <https://teslamotorsclub.com/tmc/threads/lane-change-notification.252072/>.

U.S. Appl. No. 18/471,701 Application and Drawings filed Sep. 21, 2023, 50 pages.

U.S. Appl. No. 18/334,886 Application and Drawings filed Jun. 14, 2023, 47 pages.

U.S. Appl. No. 18/334,863 Application and Drawings filed Jun. 14, 2023, 73 pages.

U.S. Appl. No. 18/334,869 Application and Drawings filed Jun. 14, 2023, 85 pages.

U.S. Appl. No. 18/334,861 Application and Drawings filed Jun. 14, 2023, 96 pages.

U.S. Appl. No. 18/334,874 Application and Drawings filed Jun. 14, 2023, 59 pages.

Active Fill Control (https://www.deere.com/en/technology-products/precision-ag-technology/guidance/active-fill-control/) 2 pages, Retrieved on Jun. 27, 2023.

Machine Sync (https://www.deere.com/en/technology-products/precision-ag-technology/guidance/machine-sync/) 3 pages, Retrieved on Jun. 27, 2023.

Extended European Search Report and Written Opinion issued in European Patent Application No. 23202822.5, dated Mar. 19, 2024, in 07 pages.

Extended European Search Report and Written Opinion issued in European Patent Application No. 23203069.2, dated Mar. 18, 2024, in 07 pages.

Extended European Search Report and Written Opinion issued in European Patent Application No. 23203519.6, dated Mar. 14, 2024, in 05 pages.

Extended European Search Report and Written Opinion issued in European Patent Application No. 23203536.0, dated Mar. 14, 2024, in 06 pages.

Extended European Search Report and Written Opinion issued in European Patent Application No. 23203537.8, dated Mar. 14, 2024, in 05 pages.

Extended European Search Report and Written Opinion issued in European Patent Application No. 23202466.1, dated Mar. 26, 2024, in 07 pages.

Extended European Search Report and Written Opinion issued in European Patent Application No. 23202485.1, dated Mar. 26, 2024, in 07 pages.

Extended European Search Report and Written Opinion issued in European Patent Application No. 23203067.6, dated Mar. 26, 2024, in 11 pages.

Extended European Search Report and Written Opinion issued in European Patent Application No. 23202510.6, dated Apr. 4, 2024, in 08 pages.

Extended European Search Report and Written Opinion issued in European Patent Application No. 23202817.5, dated Apr. 23, 2024, in 08 pages.

* cited by examiner

HARVESTING MACHINE UNLOADING CONTROL SYSTEM WITH AUTOMATED CART PARAMETER LOCATOR

CROSS-REFERENCE TO RELATED APPLICATION

The present application is based on and claims the benefit of U.S. provisional patent application Ser. No. 63/381,178, filed Oct. 27, 2022, and U.S. provisional patent application Ser. No. 63/381,187, filed Oct. 27, 2022, the content of which is hereby incorporated by reference in its entirety.

FIELD OF THE DESCRIPTION

The present description generally relates to machines that load material into receiving vehicles, such as harvesting machines that fill carts, semitrailers, or other agricultural receiving vehicles. More specifically, but not by limitation, the present description relates to automated control of an unloading operation with automatic receiving vehicle parameter location. BACKGROUND There are a wide variety of different types of vehicles that load material into other vehicles. Some such vehicles include agricultural vehicles such as forage harvesters or other harvesters (such as combine harvesters, sugarcane harvesters, silage harvesters, etc.), that harvest grain or other crop. Such harvesters often unload material into carts, which may be pulled by tractors, or semitrailers, as the harvesters are moving. Other vehicles that unload into receiving vehicles include construction vehicles, such as cold planers that unload into a dump truck and other vehicles.

Taking an agricultural harvester as an example, while harvesting in a field using a forage harvester or combine harvester, an operator attempts to control the harvester to maintain harvesting efficiency, during many different types of conditions. The soil conditions, crop conditions, etc. can all change. This may result in the operator changing control settings. This means the operator needs to devote a relatively large amount of attention to controlling the forage harvester or combine harvester.

At the same time, a semitruck or tractor-pulled cart (a receiving vehicle), is often in position relative to the harvester (e.g., alongside the harvester or behind the harvester) so that the harvester can fill the truck or cart, while moving through the field. In some current systems, this requires the operator of the harvester to control the position of the unloading spout and flap so that the truck or cart is filled evenly, but not over filled. Even a momentary misalignment between the spout and the truck or cart may result in hundreds of pounds of harvested material being dumped on the ground, rather than in the truck or cart.

The discussion above is merely provided for general background information and is not intended to be used as an aid in determining the scope of the claimed subject matter.

SUMMARY

A physical attribute of a receiving vehicle (a receiving vehicle parameter) is automatically detected by a sensor on a leading vehicle, and a calibration system locates (by calculating a calibrated offset value) the receiving vehicle parameter relative to a reference point on a following vehicle, the following vehicle providing propulsion to the receiving vehicle. The leading vehicle automatically unloads material into the receiving vehicle using the calibrated offset value corresponding to the receiving vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
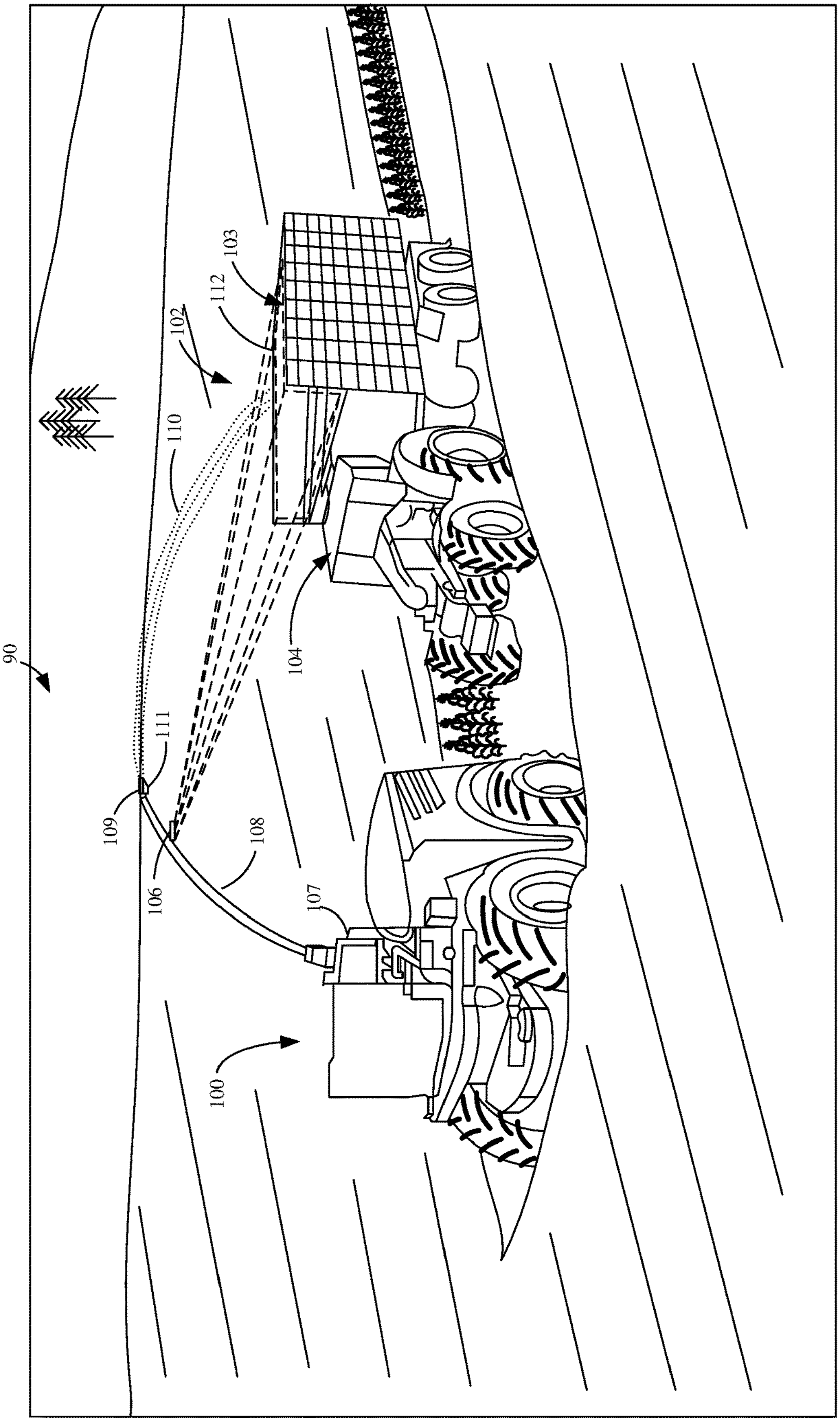
FIG. 1 is a pictorial illustration of one example of a forage harvester filling a tractor-pulled receiving vehicle, with the receiving vehicle following the forage harvester.

The present discussion proceeds with respect to an agricultural harvester, but it will be appreciated that the present discussion is also applicable to construction machines or other material loading vehicles as well, such as those discussed elsewhere herein. As discussed above, it can be very difficult for an operator to maintain high efficiency in controlling a harvester, and also to optimally monitor the position of the receiving vehicle during an unloading (or filling) operation. This difficulty can even be exacerbated when the receiving vehicle is located behind the harvester (such as a forage harvester), so that the forage harvester is executing a rear unloading operation, but the difficulty also exists in side-by-side unloading scenarios.

In order to address these issues, some automatic cart filling control systems have been developed to automate portions of the filling process. One such automatic fill control system uses a stereo camera on the spout of the harvester to capture an image of the receiving vehicle. An image processing system determines dimensions of the receiving vehicle and the distribution of crop deposited inside the receiving vehicle. The system also detects crop height within the receiving vehicle, in order to automatically aim the spout toward empty spots and control the flap position (and thus material trajectory) to achieve a more even fill, while reducing spillage. Such systems can fill the receiving vehicle according to a fill strategy (such as front-to-back, back-to-front, etc.) that is set by the operator or that is set in other ways.

In addition, some current harvesters are provided with a machine synchronization control system. The harvester may be a combine harvester so that the spout is not movable relative to the frame during normal unloading operations. Instead, the relative position of the receiving vehicle and the combine harvester is changed in order to fill the receiving vehicle as desired. Thus, in a front-to-back fill strategy, for instance, the relative position of the receiving vehicle, relative to the combine harvester, is changed so that the spout is first filling the receiving vehicle at the front end, and then gradually fills the receiving vehicle moving rearward. In such an example, the combine harvester and receiving vehicle may have machine synchronization systems which communicate with one another. When the relative position of the two vehicles is to change, the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vehicle that is currently being filled is approaching its desired fill level. In that case, the machine synchronization system on the combine harvester can send a "nudge" signal to the machine synchronization system on the towing vehicle. The "nudge", once received by the machine synchronization system on the towing vehicle, causes the towing vehicle to momentarily speed up or slow down, thus nudging the position of the receiving vehicle forward to rearward, respectively, relative to the combine harvester.

In all of the systems that attempt to automate part or all of the unloading process from a harvester into a receiving vehicle, the automated system attempts to understand where the receiving vehicle is located over time relative to the towing vehicle (e.g., the tractor pulling the receiving vehicle—also referred to has the following vehicle), and relative to the leading vehicle (e.g., the harvester or the vehicle that is controlling the following vehicle). For purposes of the present discussion, the term leading vehicle will be the vehicle that is unloading material into the receiving vehicle. The term following vehicle will refer to the propulsion vehicle, or towing vehicle, that is providing propulsion to the receiving vehicle (such as a tractor).

Determining the location of the receiving vehicle over time can be accomplished using different types of systems. In some current systems, a camera and image processor are used to capture an image (static or video) of parts of the receiving vehicle (the edges of the receiving area of the cart, the walls of the cart, the front end and rear end of the cart, etc., collectively referred to herein as receiving vehicle parameters) and an image processor processes that image in attempt to identify the receiving vehicle parameters, in real-time, during the harvesting operation. The image processor identifies the receiving vehicle parameters in the image and a controller then attempts to identify the location of the receiving vehicle parameters relative to the leading vehicle (e.g., relative to the harvester), in real-time, during harvesting and unloading.

However, this can be prone to errors. For instance, during the harvesting and unloading operation, the environment can be relatively dusty or have other obscurants so that it can be difficult to continuously identify the receiving vehicle parameters and then calculate their location relative to the leading vehicle. The dust or other obscurants in the environment can lead to an image that is difficult to process, and therefore, the accuracy in identifying the receiving vehicle parameters (and thus locating them relative to the leading vehicle) can take additional time, and can be error prone.

The present description thus proceeds with respect to a system that conducts a calibration operation that identifies one or more receiving vehicle parameters and the position of the parameter(s) relative to a reference point on the following vehicle. A detector on the leading vehicle detects the receiving vehicle parameters. Positioning systems (e.g., global navigation satellite systems—GNSS receivers) on the leading vehicle and the following vehicle communicate with one another so that the relative position of the leading vehicle, relative to the following vehicle, is known. An offset on the following vehicle between the positioning system and a reference point (such as a hitch, wheel base, etc.) is also known. A calibration system thus determines the relative position of the receiving vehicle parameters, relative to the location of the leading vehicle (as identified by the positioning system on the leading vehicle) and transposes that information into a location of the receiving vehicle parameters relative to the reference point on the following vehicle. This is referred to as the calibrated offset value corresponding to the receiving vehicle parameter. Then, during an unloading operation, the leading vehicle (e.g., the harvester) need only receive the position of the following vehicle (e.g., the GPS coordinates of the tractor). The leading vehicle can then calculate where the receiving vehicle parameter (e.g., the front wall, the side walls, the rear wall, etc. of the receiving vehicle) is located relative to the reference location on the trailing vehicle (e.g., the trailer hitch of the tractor) based upon the calibrated offset value for the particular receiving vehicle parameter under consideration.

In this way, the leading vehicle need not rely on real-time images captured in a noisy (e.g., dusty) environment to attempt to identify the location of the receiving vehicle during the unloading process. Instead, during harvesting and unloading, once the GNSS location of the following vehicle is known (or the relative position of the following vehicle is known relative to the leading vehicle), the location of the receiving vehicle can be calculated using the calibrated offset value, without performing image processing.

FIG. 1 is a pictorial illustration showing one example of a self-propelled forage harvester 100 (a material loading vehicle also referred to as a leading vehicle) filling a tractor-pulled grain cart (or receiving vehicle) 102. Cart 102 thus defines an interior that forms a receiving vessel 103 for receiving harvested material through a receiving area 112. In the example shown in FIG. 1, a tractor 104 (a towing vehicle also referred to as a following vehicle), that is pulling grain cart 102, is positioned directly behind forage harvester 100 Also, in the example illustrated in FIG. 1, forage harvester 100 has a detector such as camera 106 mounted on the spout 108 through which the harvested material 110 is traveling. The spout 108 can be pivotally or rotatably mounted to a frame 107 of harvester 100. In the example shown in FIG. 1, the detector 106 is a stereo-camera or a mono-camera that captures an image (e.g., a still image or video) of the receiving area 112 of cart 102. Also, in the example shown in FIG. 1, the receiving area 112 is defined by an upper edge of the walls of cart 102.

When harvester 100 has an automatic fill control system that includes image processing, as discussed above, the automatic fill control system attempts to identify the location of the receiving area 112 by identifying the edges or walls of the receiving area and can then gauge the height of harvested material in cart 102, and the location of that material in the receiving vehicle. The system thus automatically controls the position of spout 108 and flap 109 to direct the trajectory of material 110 into the receiving area 112 of cart 102 to obtain an even fill throughout the entire length and width of cart 102, while not overfilling cart 102. By automatically, it is meant, for example, that the operation is performed without further human involvement except, perhaps, to initiate or authorize the operation.

For example, when executing a back-to-front automatic fill strategy the automatic fill control system may attempt to move the spout and flap so the material begins landing at a first landing point in the back of vessel 103 of receiving vehicle 102. Then, once a desired fill level is reached in the back of vessel 103, the automatic fill control system moves the spout and flap so the material begins landing just forward of the first landing point in vessel 103.

There can be problems with this approach. The environment of receiving area 112 can have dust or other obscurants making it difficult to visually identify the location and bounds of receiving area 112. Thus, it can be difficult to accurately control the trajectory of material 110 to achieve the desired fill strategy.

Figure 2:
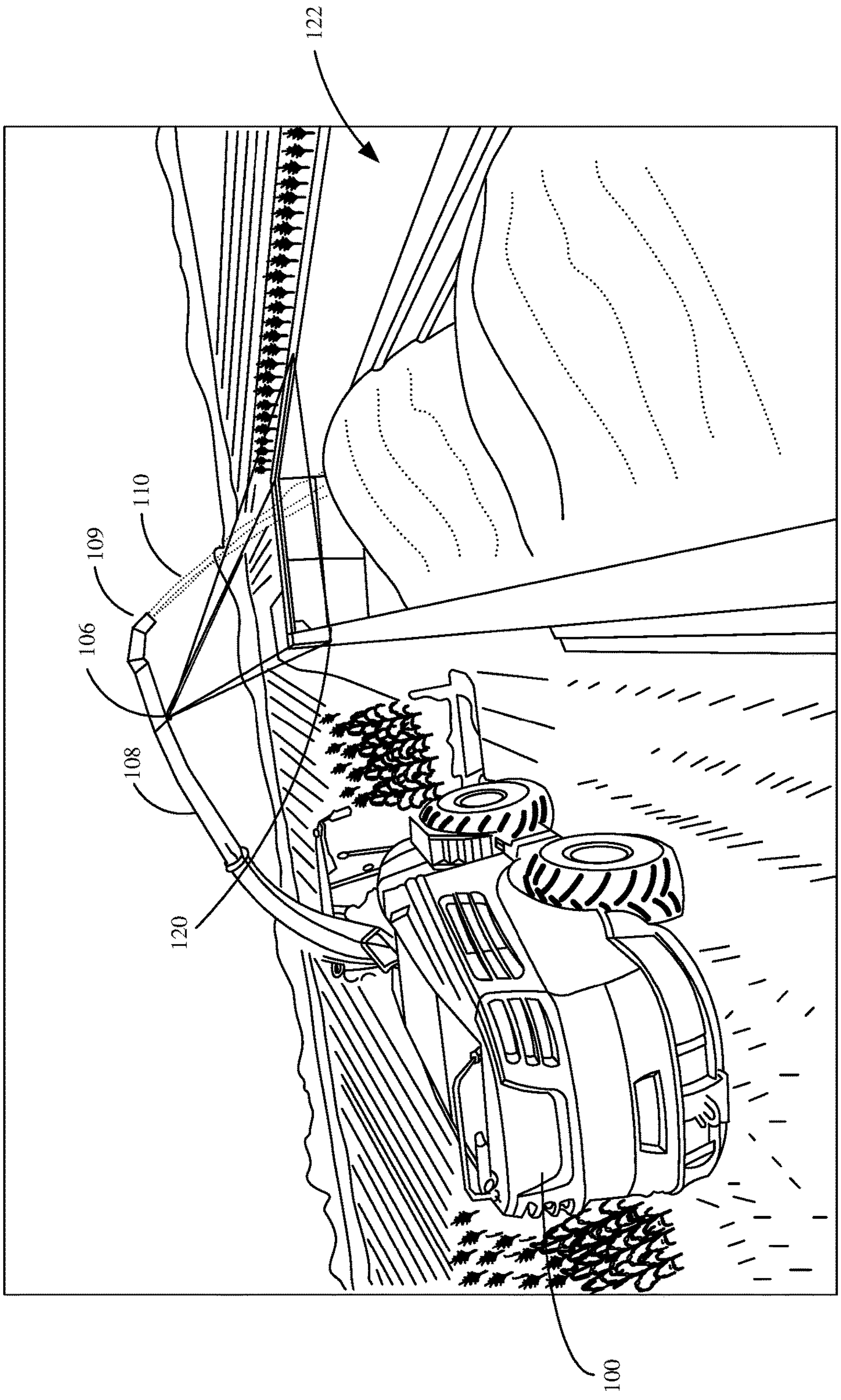
FIG. 2 is a pictorial illustration of one example of a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 122 in a configuration in which a semi-tractor (also referred to as a following vehicle) is pulling semi-trailer alongside forage harvester 100. Therefore, the spout 108 and flap 109 are positioned to unload the harvested material 110 to fill trailer 122 according to a pre-defined side-by-side fill strategy. Again, FIG. 2 shows that camera 106 can capture an image (which can include a still image or video) of semi-trailer 122. In the example illustrated in FIG. 2, the field of view of camera 106 is directed toward the receiving area 120 of trailer 122 so that image processing can be performed to identify a landing point for the harvested material in trailer 122.

Figure 3:
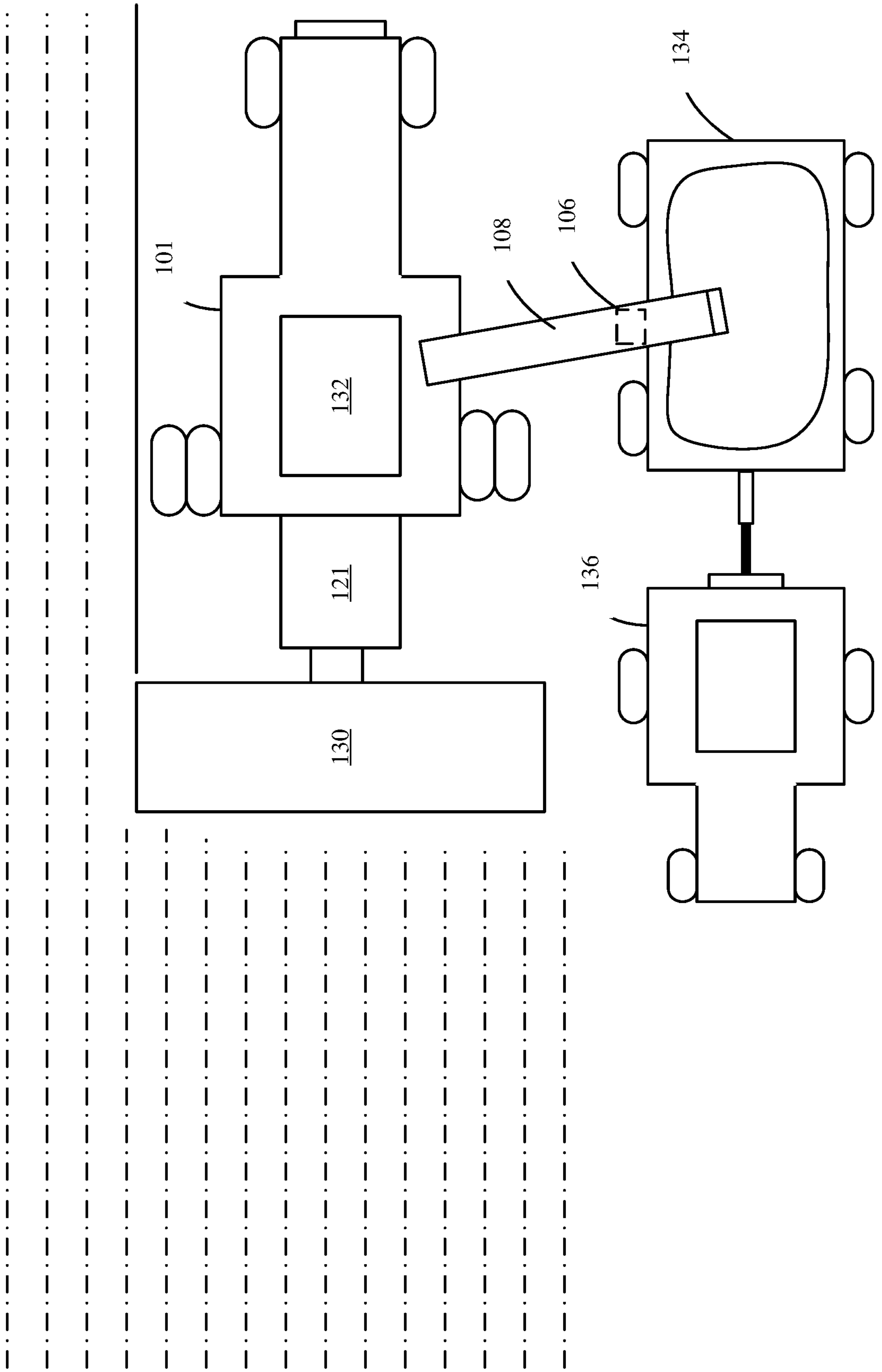
FIG. 3 shows a combine harvester filling a receiving vehicle.

FIG. 3 shows an example in which leading vehicle 101 is a combine harvester, with an operators compartment 121 and with a header 130 that engages crop. The crop is processed and placed in a clean grain tank 132, where it is unloaded (such as using an auger) through spout 108 into a receiving vehicle 134 (e.g., a grain cart) that is pulled by a following vehicle 136 (e.g., a tractor). When harvester 101 is a combine harvester, it may be that the spout 108 is not moved relative to the frame of harvester 101 during normal unloading operations. Instead, the relative position of the receiving vehicle 134 and the combine harvester 101 is changed in order to fill the receiving vessel as desired. Thus, if a front-to-back fill strategy is to be employed, then the relative position of the receiving vessel in receiving vehicle 134, relative to the combine harvester 101, is changed so that the spout 108 is first filling the receiving vehicle 134 at the front end, and then gradually fills the receiving vessel moving rearward.

In the configuration shown in FIGS. 2 and 3, spout 108 illustratively has a detector, such as a stereo camera, that again attempts to identify parameters of the receiving vehicle so that the receiving vehicle can be located and so that the unloading operation can be controlled to unload material at a desired location in the receiving vehicle to accomplish a desired fill strategy. Again, as with the configuration illustrated in FIG. 1, the environment of the receiving vehicles 122 and in FIGS. 2 and 3, respectively, may have dust or other obscurants making it difficult to identify the parameters of the receiving vehicle (e.g., the edges or walls that define the receiving vessel) during runtime.

Thus, the present description proceeds with respect to a system that conducts a calibration operation for the following vehicle and receiving vehicle to identify an offset between one of the receiving vehicle parameters (e.g., the front wall, either or both sidewalls, the rear wall, etc.) and a known reference location on the following vehicle on the following vehicle (such as the tractor hitch, the wheelbase, etc.). The offset is referred to has the calibrated offset value. The calibrated offset value can then be used during the harvesting operation to locate the receiving vehicle relative to the following vehicle without the need to identify the receiving vehicle parameters in an image that may be captured in a noisy environment (such as a dusty environment or an environment that has other obscurants) during the harvesting and unloading operation. Instead, the control system simply needs to obtain the location of the following vehicle (such as through a GNSS receiver or another location detection system) and then use that location to calculate the location of the receiving vehicle using the calibrated offset value.

Figure 4:
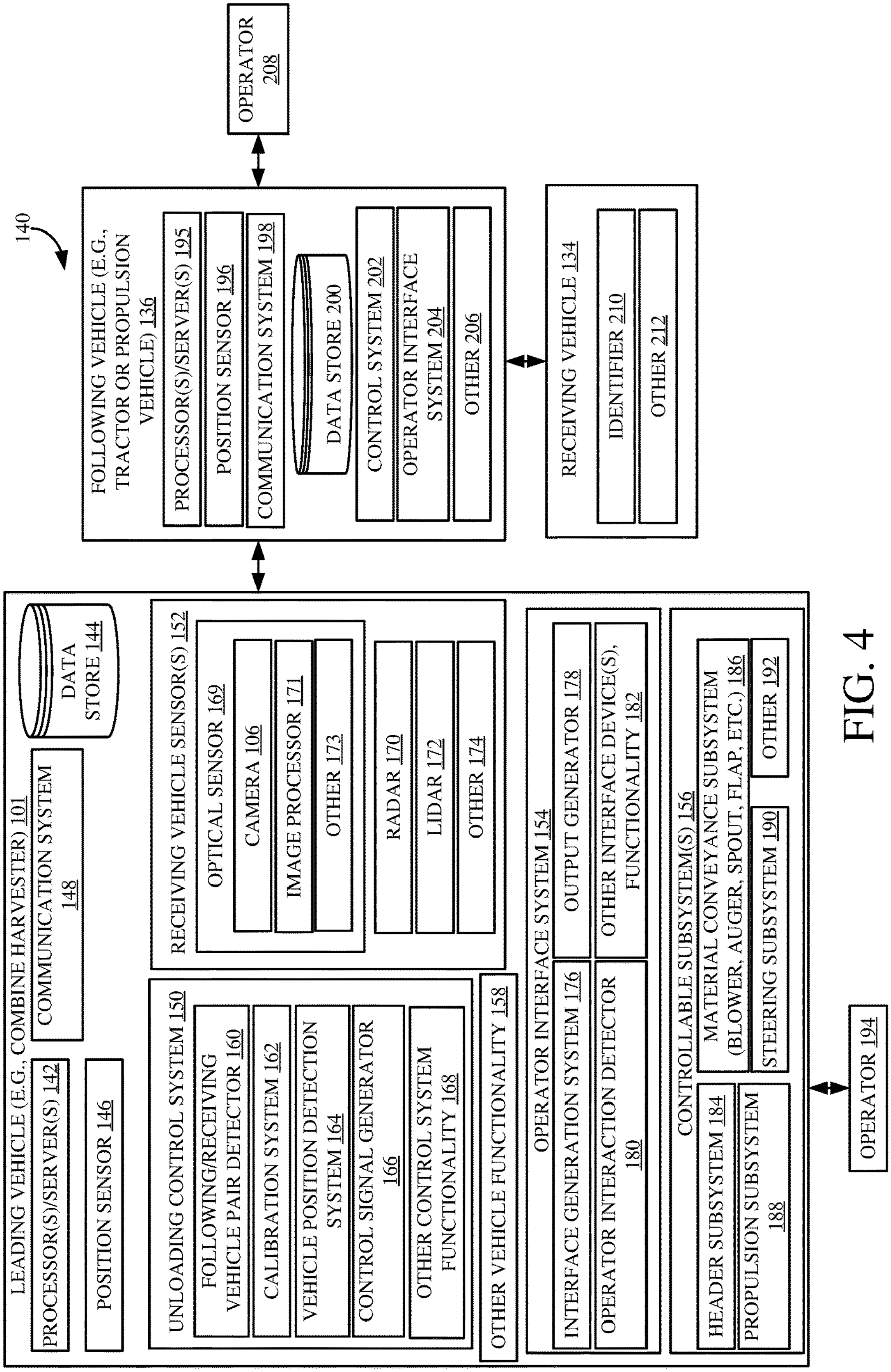
FIG. 4 is a block diagram of one example of an agricultural system.

FIG. 4 is a block diagram showing one example of an agricultural system 140 which includes leading vehicle (in the present example, a combine harvester) 101 which is followed by following vehicle (in the present example, a tractor or another propulsion vehicle) 136. Following vehicle 136 is pulling a receiving vehicle 134. It will be appreciated that while agricultural system shown in FIG. 4 includes leading vehicle 101, following vehicle 136, and receiving vehicle (e.g., the vehicles shown in the example illustrated in FIG. 3) other leading vehicles, following vehicles, and receiving vehicles can be used as well. The example shown in FIG. 4 is shown for the sake of example only.

Leading vehicle 101 includes one or more processors or servers 142, data store 144, position sensor 146, communication system 148, unloading control system 150, receiving vehicle sensors 152, operator interface system 154, controllable subsystems 156, and other vehicle functionality 158. Unloading control system 150 can include following/receiving vehicle pair detector 160, calibration system 162, vehicle position detection system 164, control signal generator 166, and other control system functionality 168. Receiving vehicle sensors 152 can include optical sensor 169, RADAR sensor 170, LIDAR sensor 172, and/or other sensors 174. Optical sensor 169 can include camera 106, image processor 171, and/or other items 173. Operator interface system 154 can include interface generation system 176, output generator 178, operator interaction detector 180, and other interface devices and/or functionality 182. Controllable subsystems 156 can include header subsystem 184, material conveyance subsystem (e.g., blower, spout, flap, etc.) 186, propulsion subsystem 188, steering subsystem 190, and other items 192. FIG. 4 also shows that leading vehicle 101 can be operated by an operator 194.

Following vehicle 136 can include position sensor 196, communication system 198, one or more processors or servers 195, data store 200, control system 202, operator interface system 204, and any of a wide variety other functionality 206. FIG. 4 also shows that following vehicle 136 is operated by operator 208. Receiving vehicle 134 can include an identifier 210 and/or other items 212. Before describing the overall operation of agricultural system 140 in more detail, a description of some of the items in system 140, and their operation, will first be provided.

Position sensor 146 can be a global navigation satellite system (GNSS) receiver, a dead reckoning system, a cellular triangulation system, or any of a wide variety of other systems that identify the coordinates or location of leading vehicle 101 in a global or local coordinate system. Data store 144 can store dimension information and orientation information, such as information that identifies the location and orientation of optical sensor 106 relative to the material conveyance system (e.g., blower, spout, flap, etc.) 186. Data store 144 can store calibrated offset values described in greater detail elsewhere here, as well as other information.

Communication system 148 enables the communication of items on vehicle 101 with other items on vehicle 101, as well as communication with following vehicle 136 and other communication. Therefore, communication system 148 can be a controller area network (CAN) bus and bus controller, a cellular communication device, a Wi-Fi communication device, a local or wide area network communication device, a Bluetooth communication device, and/or any of a wide variety of devices or systems that enable communication over different types of networks or combinations of networks.

Receiving vehicle sensors 152 sense the receiving vehicle 134 and/or parameters of receiving vehicle 134. In the example discussed herein, the parameters of receiving vehicle 134 are structural portions of receiving vehicle 134 that allow the location of the receiving area of receiving vehicle 134 to be determined. The receiving vehicle parameters, for example, may be the front wall or top front edge of the receiving vehicle 134, the side walls or top side edges of receiving vehicle 134, the rear wall or the top rear edge of receiving vehicle 134, etc. Therefore, optical sensor 169 can include camera 106 and image processor 171. During the calibration process, camera 106 can capture an image (static or video) of receiving vehicle 134 and image processor 171 can identify the location of the receiving vehicle parameters within that image. Thus, image processor 171 can identify the location of the front wall or front edge of receiving vehicle within the captured image, and/or the other receiving vehicle parameters. In other examples, RADAR sensor 170 and/or LIDAR sensor 172 can be used to identify the receiving vehicle parameters in different ways. Sensors 170 and 172 can have signal processing systems that process the signals generated by RADAR and LIDAR sensors to identify the receiving vehicle parameters.

Unloading control system 150 controls the unloading process by which material conveyance subsystem 186 conveys material from leading vehicle 101 to receiving vehicle 134. Following vehicle/receiving vehicle pair detector 160 detects the identity of following vehicle 136 and receiving vehicle 134 (e.g., the identity of this tractor/cart pair) to determine whether calibration data (e.g., calibration offset value(s) has already been generated for this particular pair of vehicles. If so, the calibration data can be retrieved from data store 144 and used to locate receiving vehicle 134 and to control the unloading process. If not, however, then calibration system performs a calibration operation for this particular following vehicle/receiving vehicle pair.

The calibration operation identifies the location of the receiving vehicle parameters (e.g., the front wall, rear wall, side walls, etc., of the receiving vehicle) relative to a reference location on the following vehicle 136 (e.g., relative to the hitch, wheelbase, etc. of following vehicle 136). This location is referred to as the calibrated offset value for this particular following vehicle/receiving vehicle pair. The calibration offset value can then be stored in data store 144 for use in identifying the location of receiving vehicle 134 and controlling the unloading operation.

Vehicle position detection system 164 detects the position of leading vehicle 101 and following vehicle 136 either in terms of absolute coordinates within a global or local coordinate system, or in terms of a relative position in which the positions of vehicles 101 and 136 are determined relative to one another. For instance, vehicle position detection system 164 can receive an input from position sensor 146 on vehicle 101 and from position sensor 196 (which may also be a GNSS receiver, etc.) on following vehicle 136 to determine where the two vehicles are located relative to one another. Vehicle position detection system 164 can then detect the location of receiving vehicle 134 relative to the material conveyance subsystem 186 using the calibration offset value for this particular following vehicle/receiving vehicle pair.

For instance, by knowing the location of following vehicle 136, and by knowing the calibrated offset values, which locate the walls (or other receiving vehicle parameter(s)), of receiving vehicle 134 relative to a reference position on following vehicle 136, vehicle position detection system 164 can identify the location of the walls of receiving vehicle 134 relative to the material conveyance subsystem 186 on leading vehicle 101. This location can then be used to determine how to control vehicles 101 and 136 to perform an unloading operation so that material conveyance system 186 loads material into receiving vehicle 134 according to a desired fill pattern.

Control signal generator 166 generates control signals that can be used to control vehicle 101 and following vehicle 136 to accomplish the desired fill pattern. For instance, control signal generator 166 can generate control signals to control the material conveyance subsystem to start or stop material conveyance, to control the spout position or flat position in order to control the trajectory of material that is being conveyed to receiving vehicle 134, or to control the propulsion system 188 or steering subsystem 190. Control signal generator 166 can also generate control signals that are sent by communication system 148 to the following vehicle 136 to "nudge" the following vehicle forward or rearward relative to leading vehicle 101, to instruct the operator of following vehicle 136 to perform a desired operation, or to generate other control signals.

Header subsystem 184 controls the header of the harvester. Material conveyance subsystem 186 may include a blower, spout, flap, auger, etc., which control conveyance of harvested material from leading vehicle 101 to receiving vehicle 134, as well as the trajectory of such material. Propulsion subsystem 188 can be an engine that powers one or more different motors, electric motors, or other systems that provide propulsion to leading vehicle 101. Steering subsystem 190 can be used to control the heading and forward/backward directions of travel of leading vehicle 101.

Operator interface system 154 can generate interfaces for operator 194 and receive inputs from operator 194. Therefore, operator interface system 154 can include interface mechanisms such as a steering wheel, joysticks, pedals, buttons, displays, levers, linkages, etc. Interface generation system 176 can generate interfaces for interaction by operator 194, such as on a display screen, a touch sensitive displays screen, or in other ways. Output generator 178 outputs that interface on a display screen or in other ways and operator interaction detector 180 can detect operator interactions with the displayed interface, such as the operator actuating icons, links, buttons, etc. Operator 194 can interact with the interface using a point and click device, touch gestures, speech commands (where speech recognition and/or speech synthesis are provided), or in other ways.

As mentioned above, position sensor 196 on following vehicle 136 may be a global navigation satellite system (GNSS) receiver, a dead reckoning system, a cellular triangulation system, or any of a wide variety of other systems that provide coordinates of following vehicle in a global or local coordinate system, or that provide an output indicating the position of following vehicle 136 relative to a reference point (such as relative to leading vehicle 101), etc. Communication system 198 allows the communication of items on vehicle 136 with one another, and also provides for communication with leading vehicle 101, and/or other systems. Therefore, communication system 198 can be similar to communication system 148 discussed above, or different. It will be assumed for the purpose of the present discussion that communication systems and 198 are similar, although this is for the sake of example only. Data store 200 can store dimension data which identify different dimensions of following vehicle 136, the location and/or orientation of different sensors on vehicle 136, and other information. Control system 202 can be used to receive inputs and generate control signals. The control signals can be used to control communication system 198, operator interface system 204, data store 200, the propulsion and/or steering subsystem on following vehicle 136, and/or other items. Operator interface system 204 can also include operator interface mechanisms, such as a steering wheel, joysticks, buttons, levers, pedals, linkages, etc. Operator interface system 204 can also include a display screen that can be used to display operator interfaces for interaction by operator 208. Operator 208 can interact with the operator interfaces using a point and click device, touch gestures, voice commands, etc.

Identifier 210 on receiving vehicle 134 may be visual indicia, or electronic indicia, or another item that specifically identifies receiving vehicle 134. Identifier 210 may also simply be the make or model of receiving vehicle 134, or another marker that identifies receiving vehicle 134.

Figure 5:
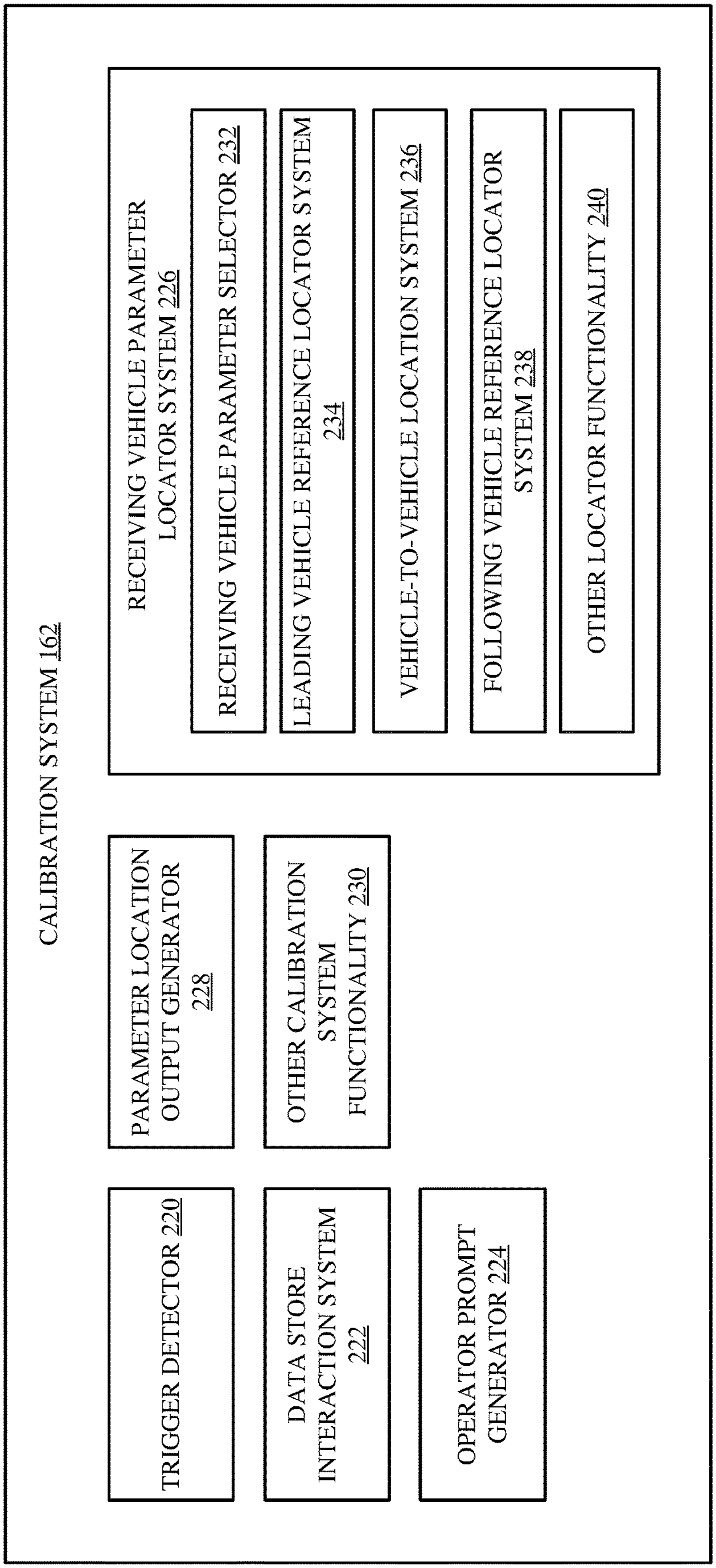
FIG. 5 is a block diagram of one example of a calibration system.

FIG. 5 is a block diagram showing one example of calibration system 162 in more detail. In the example shown in FIG. 5, calibration system 162 includes trigger detector 220, data store interaction system 222, operator prompt generator 224, receiving vehicle parameter locator system 226, parameter location output generator 228, and other calibration system functionality 230. Receiving vehicle parameter locator system 226 includes receiving vehicle parameter selector 232, leading vehicle reference locator system 234, vehicle-to-vehicle location system 236, following vehicle reference locator system 238, and other locator functionality 240. Before describing the operation of calibration system 162 in more detail, a description of some of the items in calibration system 162, and their operation, will first be described.

Trigger detector 220 detects a trigger indicating that calibration system 162 is to perform a calibration operation to identify the calibrated offset value that locates one or more receiving vehicle parameters (front wall, rear wall, side walls, etc.) relative to a reference point on a following vehicle (e.g., a towing vehicle or tractor that is providing propulsion to the receiving vehicle). In one example, trigger detector 220 detects an operator input indicating that the operator wishes to perform a calibration operation. In another example, the receiving vehicle sensors 152 (shown in FIG. 4) may detect a new following vehicle/receiving vehicle pair for which no calibrated offset value has been generated. This may trigger the calibration system 162 to perform a calibration operation. The calibration system may be triggered by leading vehicle 101 beginning to perform a harvesting operation (e.g., where the harvesting functionality is engaged) or for other reasons.

Operator prompt generator 224 then prompts the operators of one or more of leading vehicle 101 and following vehicle 136 to position receiving vehicle 134 so that the receiving vehicle parameter may be detected by one or more of the receiving vehicle sensors 152. For instance, where the receiving vehicle sensors 152 include an optical sensor (such as camera 106) then the prompt may direct the operators of the vehicles to move the vehicles in place relative to one another so that the camera 106 can capture an image of the receiving vehicle parameters and so that those parameters can be identified by image processor 171 within the image.

Figure 6:
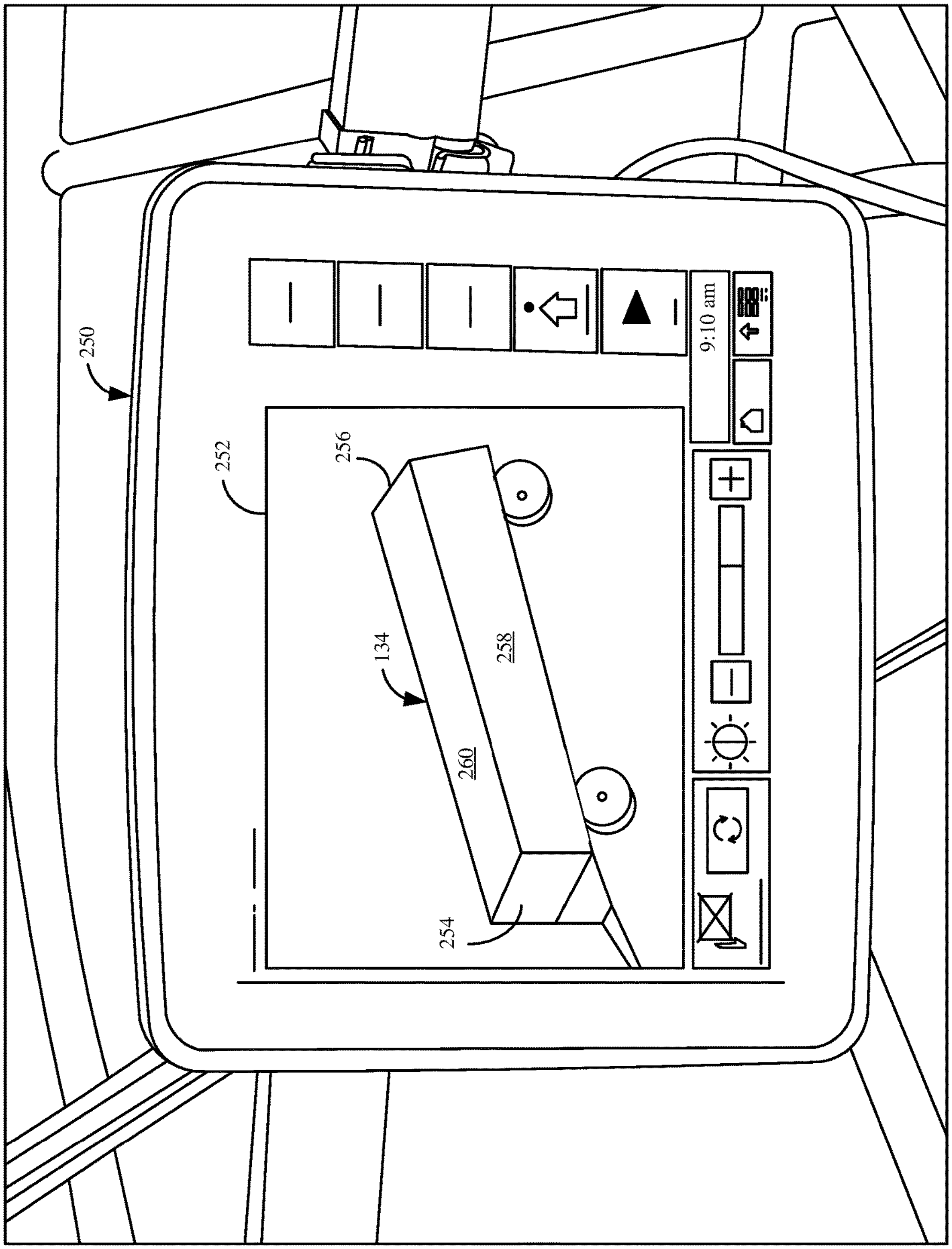
FIG. 6 is one example of an operator interface display.

FIG. 6, for instance, shows one example of a user interface display device 250 displaying a display 252 that can be generated for the operator of either leading vehicle 101 or following vehicle 136 or both. Operator interface display 252 includes displays an image (static or video) taken by camera 106. In the example shown in FIG. 6, the operators have moved the vehicles into position relative to one another so that the an image of receiving vehicle 134 can be captured by camera 106. In the example shown in FIG. 6, receiving vehicle 134 includes a front wall 254, a rear wall 256, a near wall 258 (which is near camera 106), and a far wall 260 which is further from camera 106 than near wall 258). The top edges of each of the walls 254-260 are also visible in the image illustrated in display 252.

Returning to the description of FIG. 5, data store interaction system 222 can interact with data store 144 to obtain dimension information indicating the location and orientation of camera 106 (or other receiving vehicle sensors 152) that is used to detect the receiving vehicle parameters. Image processor 171 then processes the image to identify the receiving vehicle parameters (such as the walls 254-260) within the captured image. Receiving vehicle parameter locator system 226 can then process the location of the receiving vehicle parameters in the captured image to identify the location of the receiving vehicle parameters relative to a reference point on the following vehicle (e.g., tractor) 134. In doing so, receiving vehicle parameter selector 232 selects which receiving vehicle parameter is to be processed first (such as front wall 254, rear wall 256, or side walls 258 and/or 260). Leading vehicle reference locator system 234 then identifies the location of the selected parameter (for purposes of the present description it will be assumed that the selected receiving vehicle parameter is front wall 254) relative to a reference point on the leading vehicle 101. For instance, system 234 can identify the location of the front wall 254 of receiving vehicle 134 relative to the location of the GPS receiver (or other position sensor) 146 on leading vehicle 101. Vehicle-to-vehicle location system 236 then communicates with the following vehicle 136 to identify the location of leading vehicle 101 relative to the location of following vehicle 136. In particular, system 236 may identify the location of the position sensor 146 on leading vehicle 101 relative to the location of the position sensor 196 on following vehicle 136.

Following vehicle reference locator system 238 then identifies the location of the selected parameter (the front wall 254) of receiving vehicle 134 relative to the reference point on following vehicle 136. For instance, where the reference point on following vehicle 136 is the hitch, then following vehicle reference locator system 238 first identifies the location of front wall relative to the position sensor 196 on following vehicle 136 and then, using dimension information or other information about following vehicle 136, identifies the offset between the reference position (the hitch) on following vehicle 136 and the position sensor 196 on following vehicle 136. Once this offset is known, then the location of the front wall 254 of receiving vehicle to the hitch can be calculated by following vehicle reference locator system 238. The result is that system 238 generates an output indicating the location of the selected receiving vehicle parameter (in this case the front wall 254 of receiving vehicle 134) relative to the reference point on the following vehicle 136 (in this case the hitch of following vehicle 136). This is referred to herein as the calibrated offset value.

Parameter location output generator 228 generates an output from calibration system 162 to store the calibration offset value in data store 144 for his particular following vehicle 136/receiving vehicle 134 pair. Thus, when vehicle position detection system 164 on leading vehicle 101 encounters this following vehicle 136/receiving vehicle 134 pair during the harvesting operation, the calibrated offset value can be retrieved and used in controlling the unloading operation during which harvested material is unloaded from leading vehicle 101 into receiving vehicle 134.

Figure 7A:
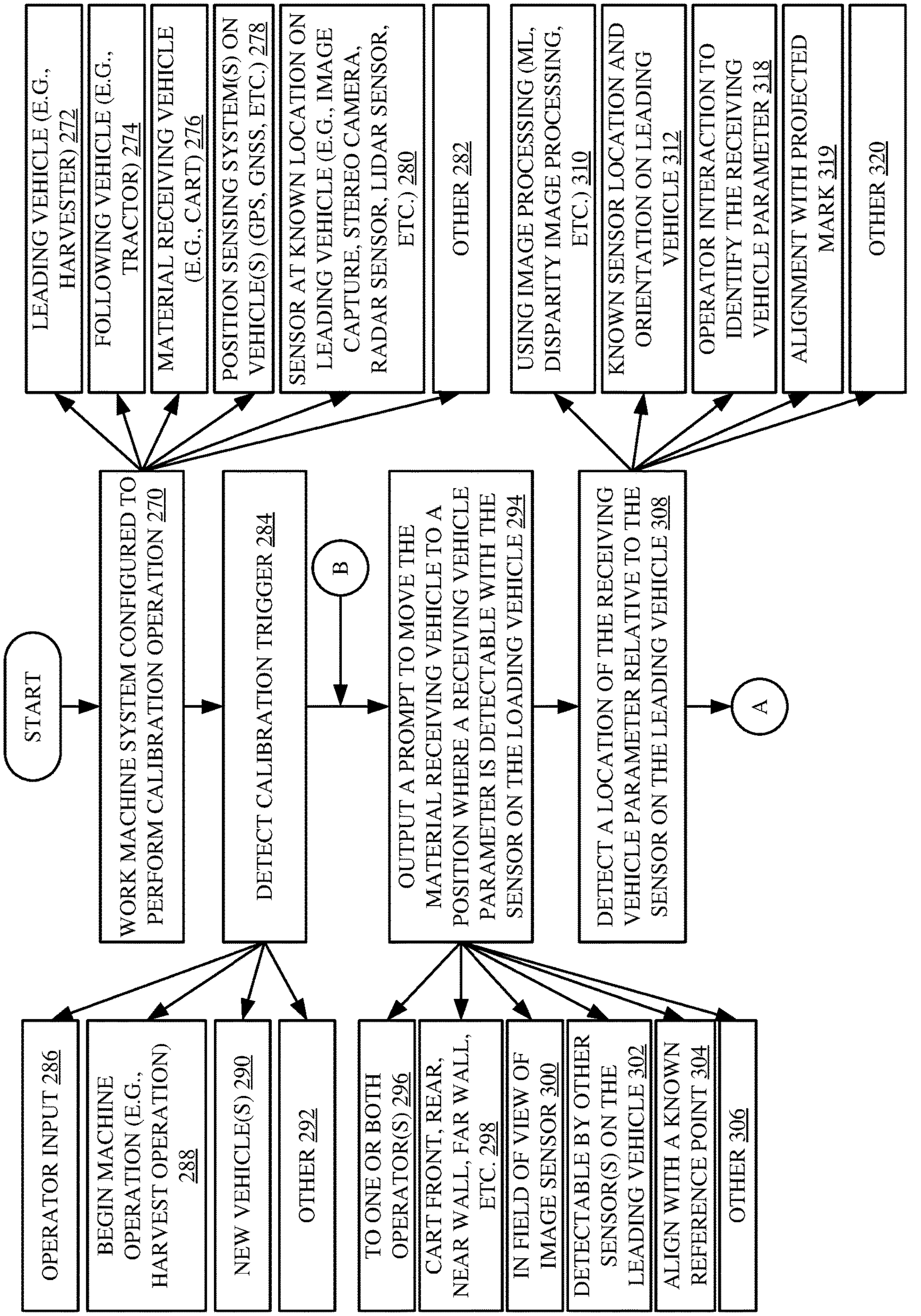
FIGS. 7A and 7B (collectively referred to as FIG. 7) show a flow diagram illustrating an example operation of a harvesting machine.
Figure 7B:
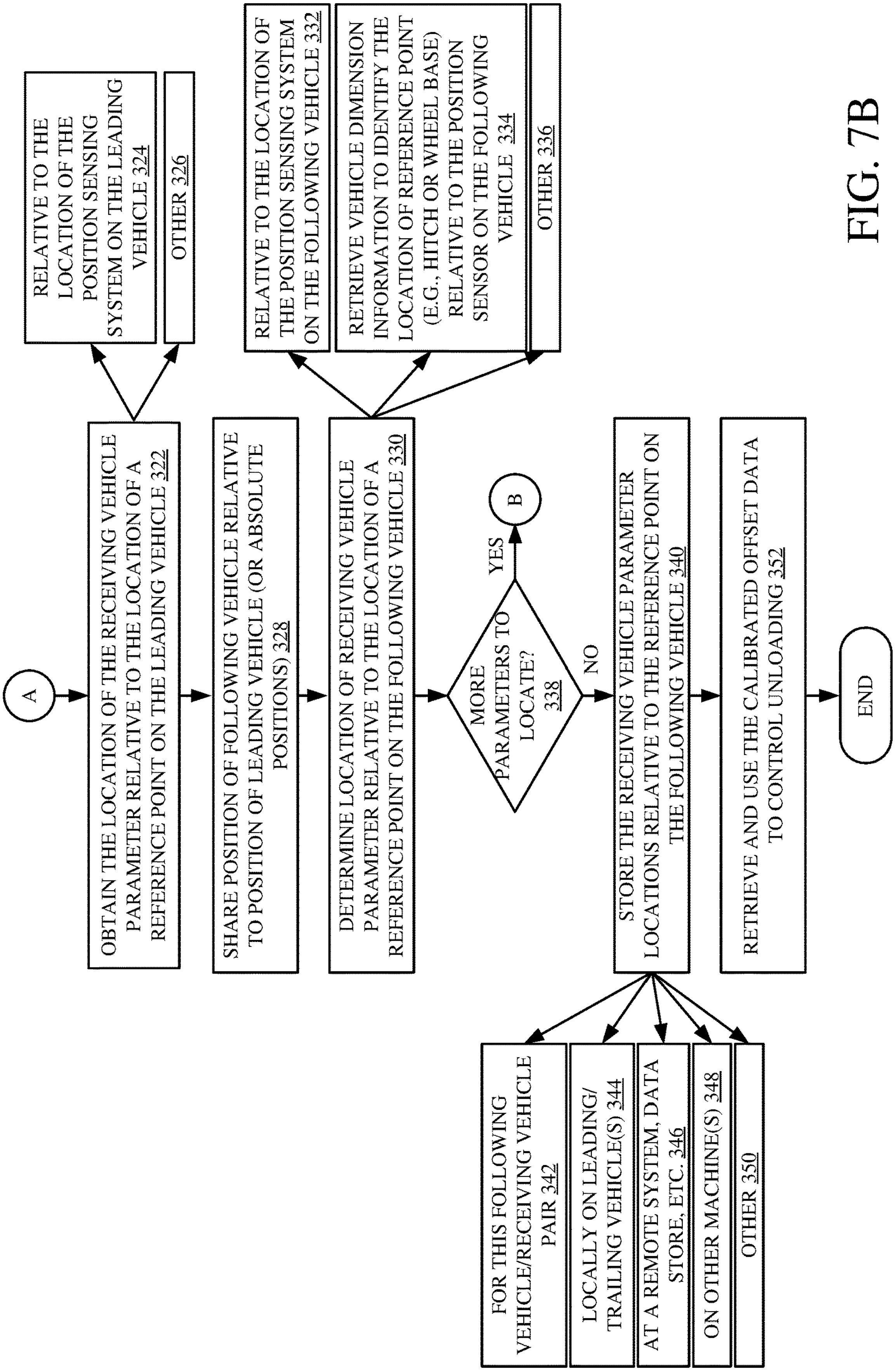

FIGS. 7A and 7B (collectively referred to herein as FIG. 7) show a flow diagram illustrating one example of the operation of agricultural system 140 in performing a calibration operation to identify the calibrated offset value corresponding to one or more receiving vehicle parameters of receiving vehicle 134. It is first assumed that the work machines are configured so that a calibration operation can be performed, as indicated by block 270 in the flow diagram of FIG. 7. In one example, the leading vehicle 101 is a harvester as indicated by block 272 and the following vehicle is a tractor or other towing vehicle as indicated by block 274. Also in the example, the receiving vehicle is a grain cart as indicated by block 276. Also, in the present example, it is assumed that both the leading vehicle and the following vehicle have a position sensing system 146, 196, respectively, as indicated by block 278 in the flow diagram of FIG. 7. Further, it is assumed that leading vehicle 101 has a receiving vehicle sensor 152 that is at a known location and orientation on leading vehicle 101, as indicated by block 280 in the flow diagram of FIG. 7. The receiving vehicle sensor 152 may be an image capture device, such as a stereo camera 106, a RADAR sensor 170, a LIDAR sensor 172, etc. The work machines may be configured in other ways to perform the calibration operation as well, as indicated by block 282 in the flow diagram of FIG. 7.

Detecting a calibration trigger is indicated by block 284 in the flow diagram of FIG. 7. In one example, operator 194 may provide an operator input through operator interface system to trigger a calibration operation for the following vehicle 136/receiving vehicle 134 pair. Detecting a trigger based on an operator input is indicated by block 286 in the flow diagram of FIG. 7. Calibration trigger detector 220 may detect a trigger based upon leading vehicle 101 beginning to perform the harvesting operation, which may be detected by detecting engagement of the header or other harvesting functionality, or in another way. Detecting a trigger based upon the beginning of the machine operation is indicated by block 288 in the flow diagram of FIG. 7. The calibration trigger may be detected based on following vehicle/receiving vehicle pair detector detecting that the current following vehicle/receiving vehicle pair is a new pair for which no calibration offset data has been generated. Detecting a trigger based on the detection of a new vehicle (one for which no calibration offset data is stored) is indicated by block 290 in the flow diagram of FIG. 7. The calibration trigger can be detected in a variety of other ways, based upon other trigger criteria as well, as indicated by block 292 in the flow diagram of FIG. 7.

Once the calibration operation has been triggered, operator prompt generator 224 generates a prompt that can be displayed or otherwise output to operator 194 and/or operator 208 by operator interface systems 154, 204, respectively. The prompt prompts the operator, to move the vehicles so the material receiving vehicle 134 is in a position where at least one of the receiving vehicle parameters is detectable by the receiving vehicle sensor(s) 152 on leading vehicle 101. Outputting such a prompt is indicated by block 294 in the flow diagram of FIG. 7, and outputting the prompt to one or both operators is indicated by block 296. Again, the receiving vehicle parameters to be detected may include the front wall 254, rear wall 256, near wall 258, far all 260, etc., as indicated by block 298 in the flow diagram of FIG. 7.

Therefore, for instance, the operators 194, 208 of the vehicles 101, 136 may position receiving vehicle 134 so that the receiving vehicle parameter to be located is in the field of view of the image sensor or camera 106, as indicated by block 300 in the flow diagram of FIG. 7. In another example, the receiving vehicle parameter to be located is detectable by one of the other sensors 170-174 on leading vehicle 101, as indicated by block 302 in the flow diagram of FIG. 7. In yet another example, the receiving vehicle parameter to be located (e.g., the front wall of vehicle 134) is aligned with a known point of reference on leading vehicle 101. For instance, it may be that the spout 108 on the combine harvester 101 is at a known location relative to the position sensor 146 on combine harvester 101. In that case, the front wall 254 of receiving vehicle may be aligned with the spout 108 so that the location of front wall 254, relative to the reference point (e.g., spout 108) on leading vehicle 101 is known. Aligning the receiving vehicle parameter to be located with a known reference point on the leading vehicle 101 is indicated by block 304 in the flow diagram of FIG. 7. The prompt can be output to the operators in other ways as well, as indicated by block 306 in the flow diagram of FIG. 7.

Leading vehicle reference locator system 234 then detects a location of the receiving vehicle parameter (e.g., front wall 254) relative to the sensor 152 on the leading vehicle as indicated by block 308 in the flow diagram of FIG. 7. In one example, camera 106 captures an image of receiving vehicle 134 and image processor 171 processes the image captured by camera using a machine learned processor, or disparity image processor, etc., in order to identify the location of the receiving vehicle parameter (e.g., front wall 254) in the captured image, as indicated by block 310. System 234 can then obtain data identifying the known sensor location and/or orientation of the receiving vehicle sensor 152 (e.g., camera 106) on leading vehicle 101, as indicated by block 312. System 234 uses the location of the front wall 254 in the captured image and the location and orientation of the camera 106 to calculate the location of front wall 254 relative to camera 106.

Figure 8:
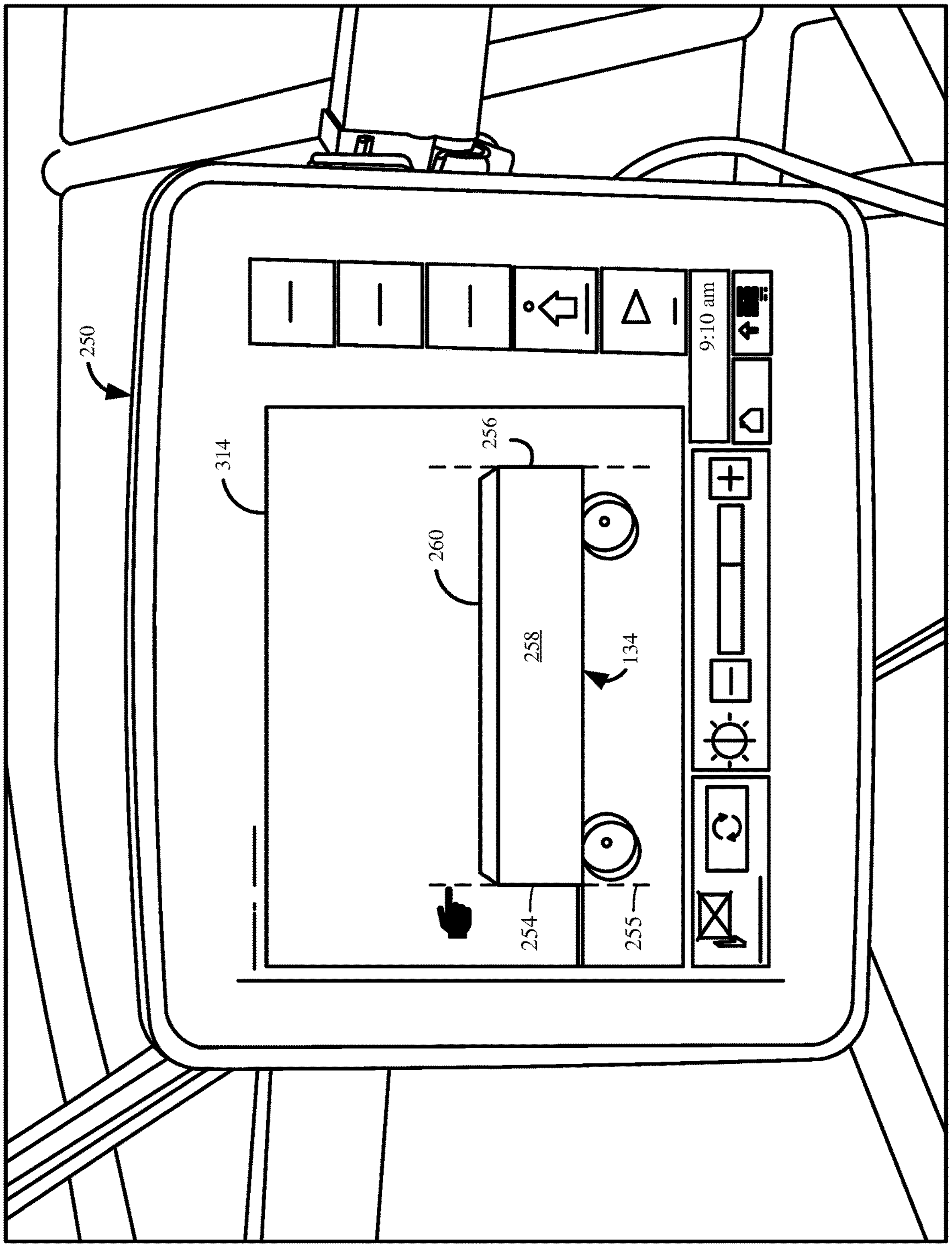
FIGS. 8 and 9 show examples of operator interface displays.

It will be noted that, instead of using image processing to identify the location of front wall 254 (or another receiving vehicle parameter) in the captured image, an operator input can be used to identify the receiving vehicle parameter in the captured image. FIG. 8, for instance, shows one example of an operator interface display 314 on a display device 250 displaying a side view of the receiving vehicle 134. The side view is slightly elevated so that the front wall 254, rear wall 256, near wall 258, and far wall 260, of receiving vehicle 134 are all visible. In the example shown in FIG. 8, operator 194 can use a touch gesture (or point and click device) to trace along the front wall 254 (as indicated in FIG. 8) to identify the location of front wall 254 in the captured image. Also, of course, where the receiving vehicle parameter to be located is the rear wall, or the side walls, operator 194 can trace along those walls.

In another example, system 226 can project a line on the video displayed to the operator and the operator can then align the receiving vehicle parameter (e.g., front wall 254) with the line. For example, in FIG. 8, system 226 can project line 255 on the display 314 (which may be a live video feed from camera 106) so the operator(s) can align front wall 254 with line 255. System 226 knows the pixels used to display line 255. Therefore, once front wall 254 is aligned with line 255 (which can be indicated by an operator input), system 226 will know the location of front wall 254 in the image 314.

Figure 9:
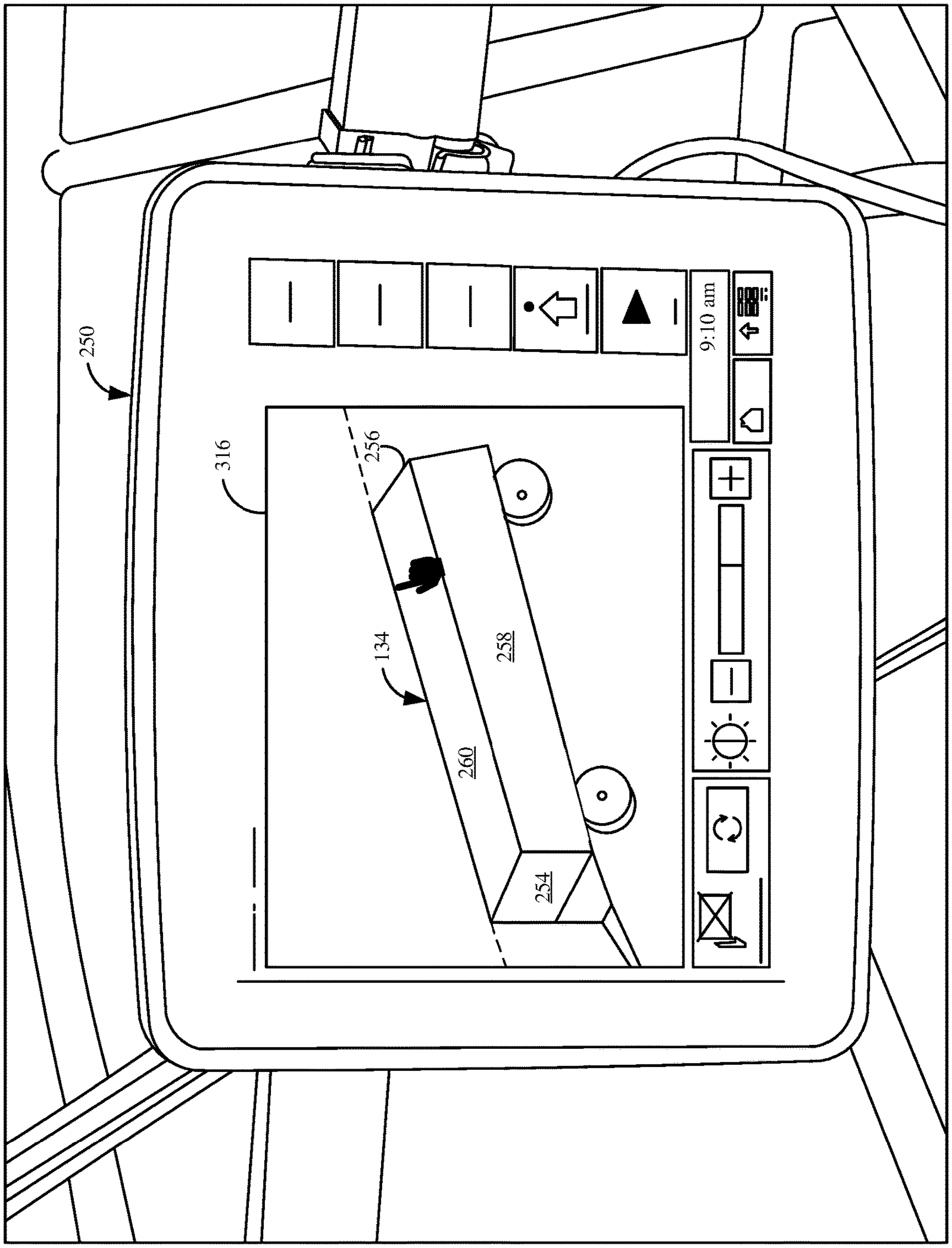

FIG. 9, for example, is similar to FIG. 8 and similar items are similarly numbered. However, the view of receiving vehicle 134 is slightly more elevated and from a slightly different perspective than that shown in FIG. 8. In FIG. 9, it can be seen that the operator has traced along the top edge of the far wall 260 (or a line has been projected at that location and wall 260 has been aligned with the line) to identify the location of the far wall 260 in the displayed image 316. Identifying the receiving vehicle parameter (e.g., one of walls of the receiving vehicle or top edge of the wall, etc.) based on operator interaction with the displayed image is indicated by block 318 in the flow diagram of FIG. 7. Projecting a line and aligning the receiving vehicle parameter with the line is indicated by block 319. Detecting a location of the receiving vehicle parameter in the image and relative to the camera 106 can be done in other ways as well, as indicated by block 320.

Again, once the location of the receiving vehicle parameter is identified in the image, then using the known location and orientation of the camera 106, the location of the receiving vehicle parameter can be identified relative to one or more other reference points on receiving vehicle 101.

Calculating or otherwise obtaining the location of the receiving vehicle parameter relative to the location of a reference point on the leading vehicle 101 is indicated by block 322 in the flow diagram of FIG. 7. In one example, the reference point on leading vehicle 101 is the location of the position sensor 146. Thus, leading vehicle reference locator system 234 identifies the location of the receiving vehicle parameter (e.g., front wall 254) on receiving vehicle 134 relative to the location of the position sensor 146 on leading vehicle 101, as indicated by block 324 in the flow diagram of FIG. 7. Of course, where the reference point is a different reference point on leading vehicle 101, then the location of the receiving vehicle parameter (e.g., front wall 254) relative to that reference point can be calculated as well. Identifying the location of the receiving vehicle parameter relative to the location of another reference point on leading vehicle 101 is indicated by block 236 in the flow diagram of FIG. 7.

Vehicle-to-vehicle location system 236 uses communication system 148 and communication system 198 to communicate with one another so that the position of following vehicle 136 can be identified relative to the position of the leading vehicle 101 as indicated by block 328. In one example, the position of one vehicle relative to the other can be calculated using the absolute positions of both vehicles sensed by the corresponding position sensors 146 and 196. In another example, other sensors can be used (such as RADAR, LIDAR, etc.) to detect the relative position of the two vehicles.

Once vehicle-to-vehicle location system 236 identifies the relative locations of the two vehicles relative to one another, then following vehicle reference locator 238 can identify the location of the receiving vehicle parameter (e.g., front wall 254) relative to the coordinates of a reference point on the following vehicle 136, as indicated by block 330 in the flow diagram of FIG. 7. The reference point on following vehicle 136 can be any of a wide variety of different reference points, such as the location of the position sensor 196, the location of a hitch or wheelbase, etc. Determining the location of the receiving vehicle parameter (e.g., front wall 254) relative to the location of position sensor 196 on following vehicle 136 is indicated by block 332 in the flow diagram of FIG. 7. Determining the location of the receiving vehicle parameter (e.g., front wall 254) relative to the hitch or wheel base of the following vehicle 136 can be done by retrieving vehicle dimension information from data store 200 or data store 144 or elsewhere, where the dimension information identifies the location of the reference point relative to the position sensor 196. Identifying the location of the receiving vehicle parameter relative to another reference point on following vehicle 136 in this way is indicated by block 334 in the flow diagram of FIG. 7. The location of the receiving vehicle parameter (e.g., front wall 254) relative to the location of a reference point on the following vehicle 136 can be done in a wide variety of other ways as well, as indicated by block 336 in the flow diagram of FIG. 7.

When more receiving vehicle parameters (e.g., rear wall, side walls, etc.) are to be located relative to the reference point on following vehicle 136, as indicated by block 338 in the flow diagram of FIG. 7, processing reverts to block 294 where the operators are prompted to position the two vehicles relative to one another so that the next receiving vehicle parameter can be detected by the receiving vehicle sensors 152 (e.g., camera 106) on leading vehicle 101. It will be noted that, in one example, the location of the receiving vehicle parameters relative to a reference position on the following vehicle 136 can be determined or calculated in a priority order. The priority may be to first locate the front wall 254, then the rear wall 256, then the near wall 258 and finally the far wall 260. In another example, only the front wall 254 is located and then known dimensional information (e.g., the length of the receiving vehicle 134) is used to identify the location of the rear wall. Similarly, a center point on the front wall 254 can be located and then width information that defines the width dimension of receiving vehicle 134 can be used to locate the side walls 258 and 260. In yet another example, the top edges of the walls 254-260 are identified to define the material-receiving opening in material receiving vehicle 134. These are just examples of the different receiving vehicle parameters that can be located relative to a reference point on the following vehicle 134. Other receiving vehicle parameters can be located as well, and they can be located in different orders.

Parameter location output generator 228 can generate an output indicative of the locations of the receiving vehicle parameters relative to the reference point on the following vehicle 134, as calibrated offset values, to data store interaction system 222 which can store the calibrated offset values in data store 144, data store 200, or elsewhere, where the values can be retrieved by leading vehicle 101 when performing the harvesting operation, and when locating the receiving vehicle 134 during an unloading operation. Storing the receiving vehicle parameter locations relative to the reference point on the following vehicle 136 is indicated by block 340 in the flow diagram of FIG. 7.

In one example, the calibrated offset values are stored and indexed by the particular following vehicle 136/receiving vehicle 134 pair for which the calibrated offset values are calculated, as indicated by block 342 so that the values can be looked up during later operation, when a harvester is unloading to this particular following vehicle 136/receiving vehicle 134 pair (or a similar pair). In one example, the calibration offset values are stored locally in data store 144 on vehicle 101, or locally in data store 200 on following vehicle 136, as indicated by block 344. In another example, the calibrated offset values can be stored remotely in a cloud-based system, in another remote server architecture, on a different machine, or in a different system which can then be accessed by leading vehicle 101 at an appropriate time, as indicated by block 346. In another example, the calibrated offset values can be transmitted to other vehicles (such as other harvesters, etc.) so that the calibration need not be performed by all of the other leading vehicles which may encounter this particular following vehicle 136/receiving vehicle 134 pair. Sending the calibrated offset values to other vehicles is indicated by block 348 in the flow diagram of FIG. 7. The calibrated offset values can be stored in other ways, and used in other ways (such as in controlling the unloading operation during a subsequent process), as indicated by block 350 in the flow diagram of FIG. 7. Retrieving and using the calibrated offset values to control an unloading operation is indicated by block 352 in the flow diagram of FIG. 7.

It can thus be seen that the present description has described a system which performs a calibration operation that can be used to locate different receiving vehicle parameters relative to a reference point on a following vehicle. This calibrated offset values can then be stored and used in locating the receiving vehicle during subsequent unloading operations so that the receiving vehicle need not be located using visual image capture and image processing, which can be error prone. This increases the accuracy of the unloading operation.

Figure 10:
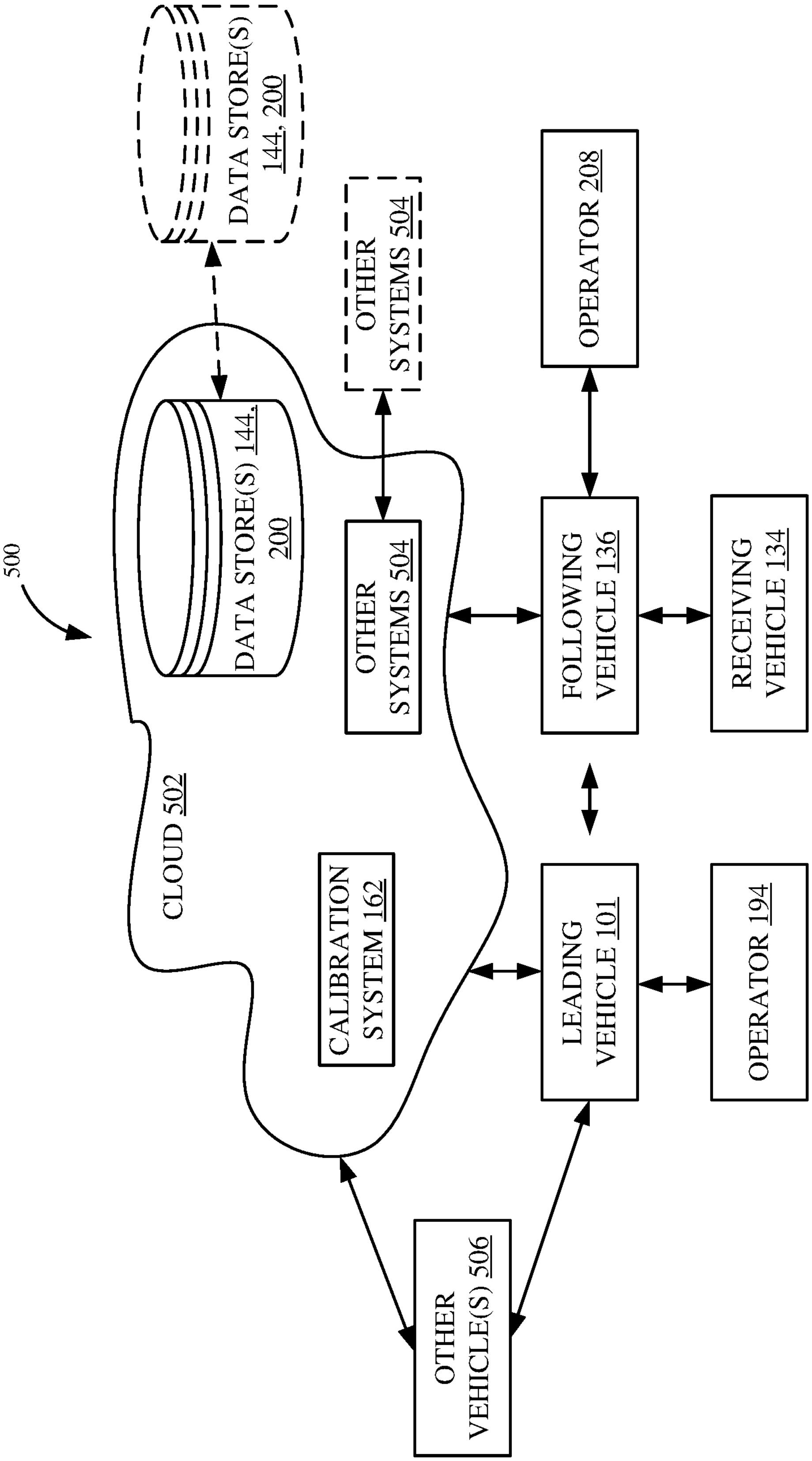
FIG. 10 is a block diagram showing one example of a harvesting machine deployed in a remote server architecture.

FIG. 10 is a block diagram illustrating agricultural machine 140, shown in FIG. 4, except that system 140 is disposed in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 10, some items are similar to those shown in FIG. 4 and they are similarly numbered. FIG. 7 specifically shows that data stores 144, 200, calibration system 162, and other systems 504, can be located at a remote server location 502. Therefore, vehicles 101, 136 can access those systems through remote server location 502.

FIG. 10 also depicts another example of a remote server architecture. FIG. 10 shows that it is also contemplated that some elements of FIG. 4 can be disposed at remote server location while others are not. By way of example, one or more of data stores 144, 200 and other systems 504, or other items can be disposed at a location separate from location 502, and accessed through the remote server at location 502. Regardless of where the items are located, the items can be accessed either directly by machine 101 and/or machine 136, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. All of these architectures are contemplated herein.

FIG. 10 shows that other vehicles 506 can communicate with one or more vehicles 101, 136, or with remote server environment 502 to obtain the calibrated offset values and/or other information. It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
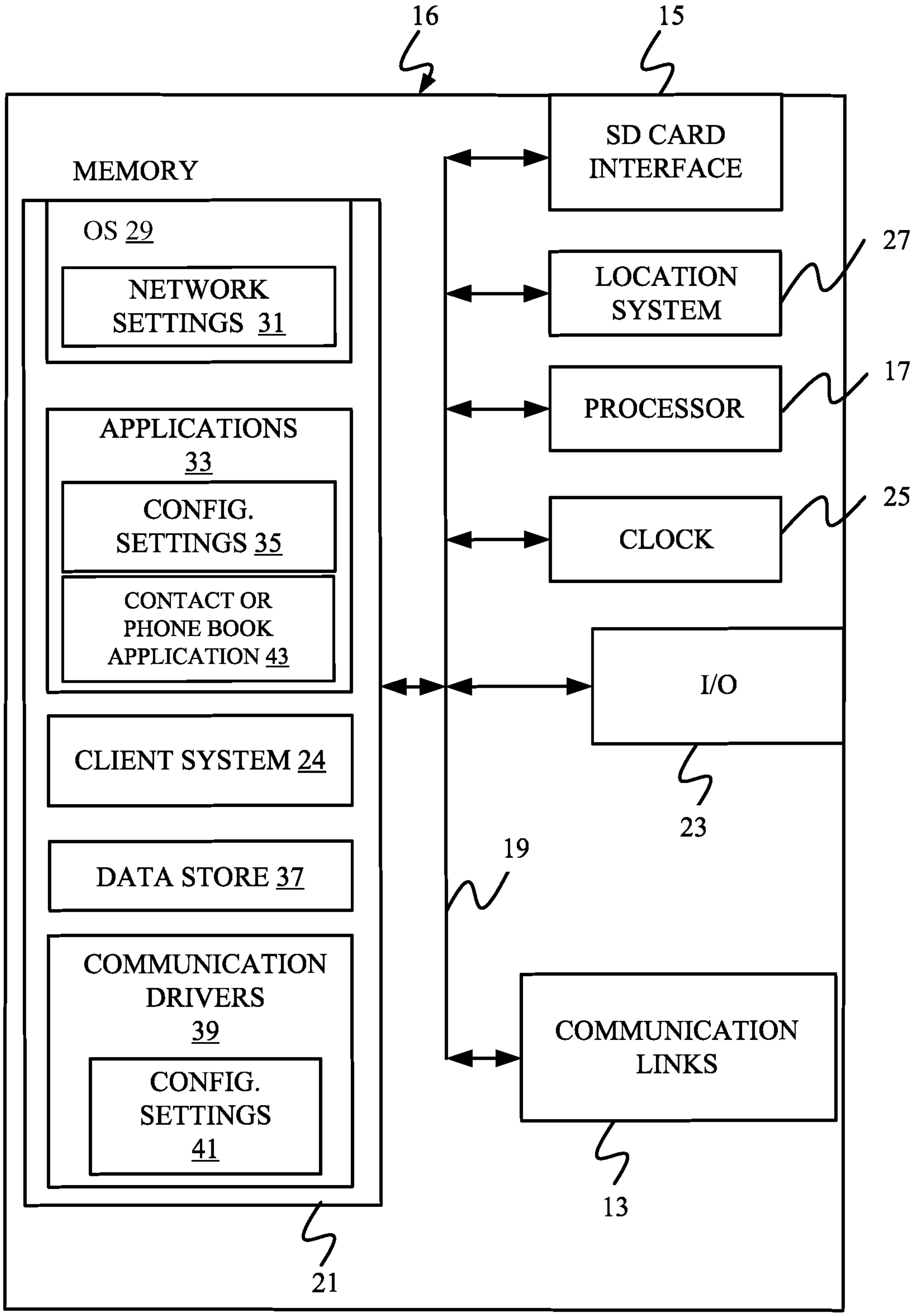
FIGS. 11-13 show examples of mobile devices that can be used in the machines and systems described in other figures.
Figure 12:
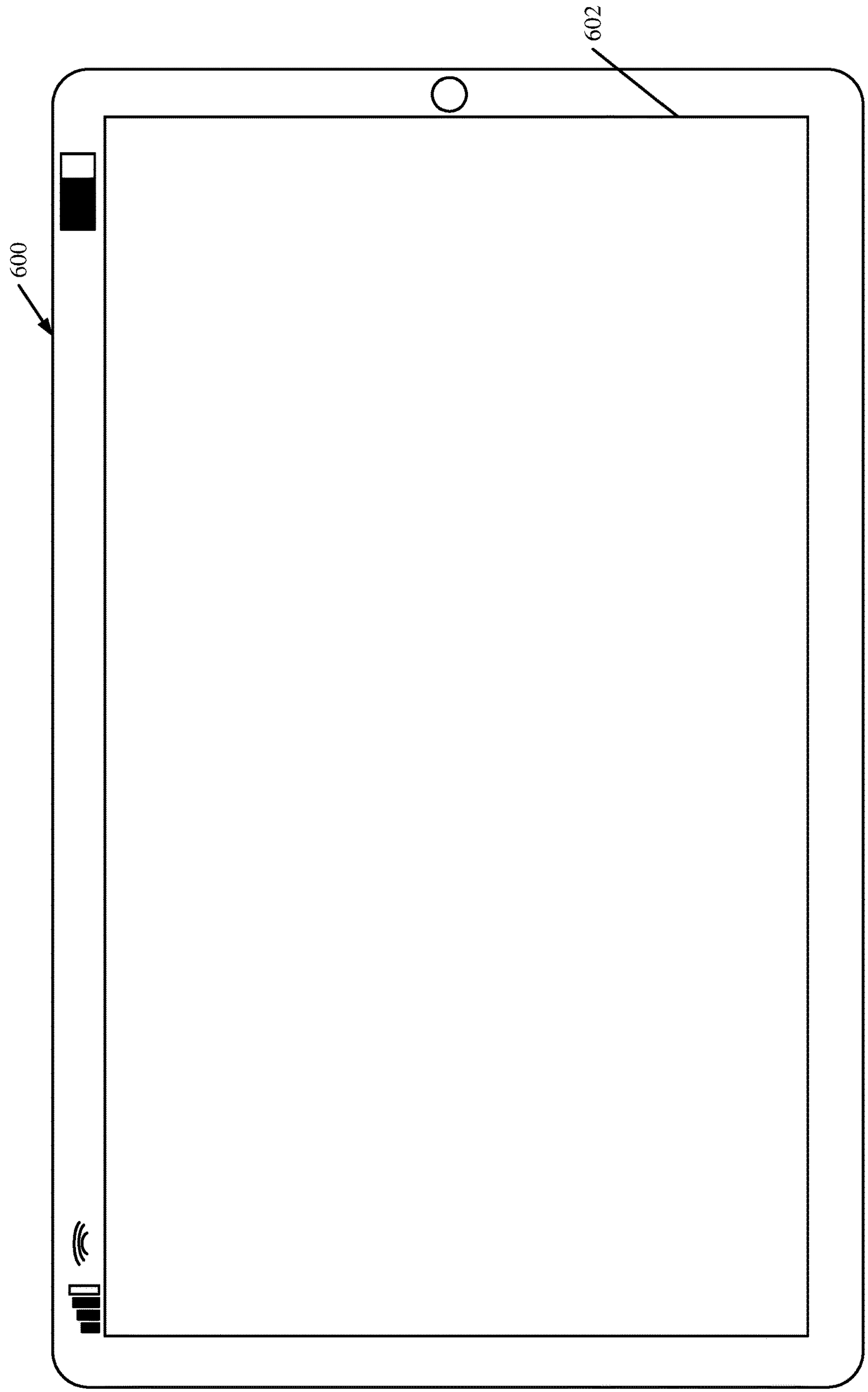
Figure 13:
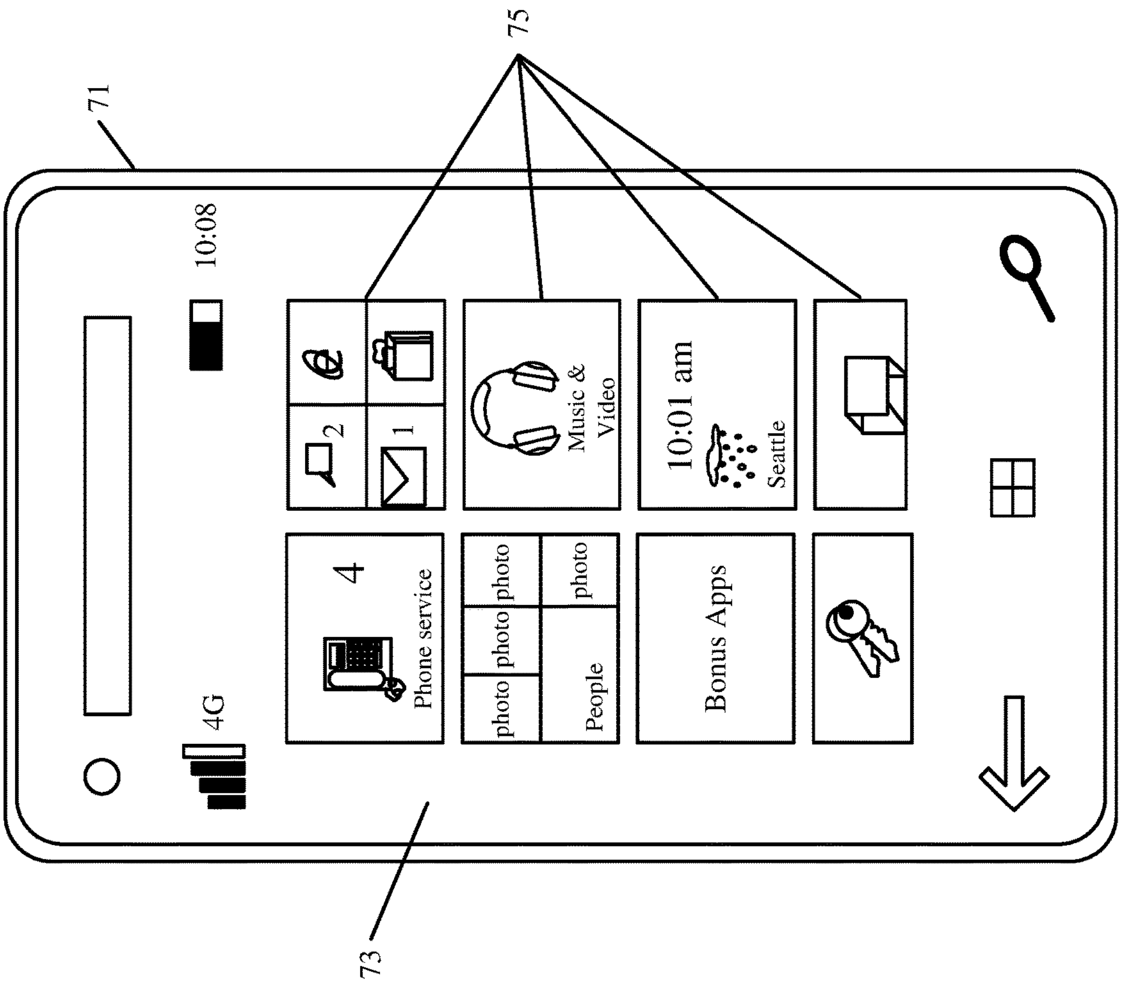

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of one or both of vehicles 101, 136 for use in generating, processing, or displaying the calibrated offset values. FIGS. 12-13 are examples of handheld or mobile devices.

FIG. 11 provides a general block diagram of the components of a client device 16 that can run some components shown in FIG. 4, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one example in which device 16 is a tablet computer 600. In FIG. 12, computer 600 is shown with user interface display screen 602. Screen 602 can be a touch screen or a pen-enabled interface that receives inputs from a pen or stylus. Tablet computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
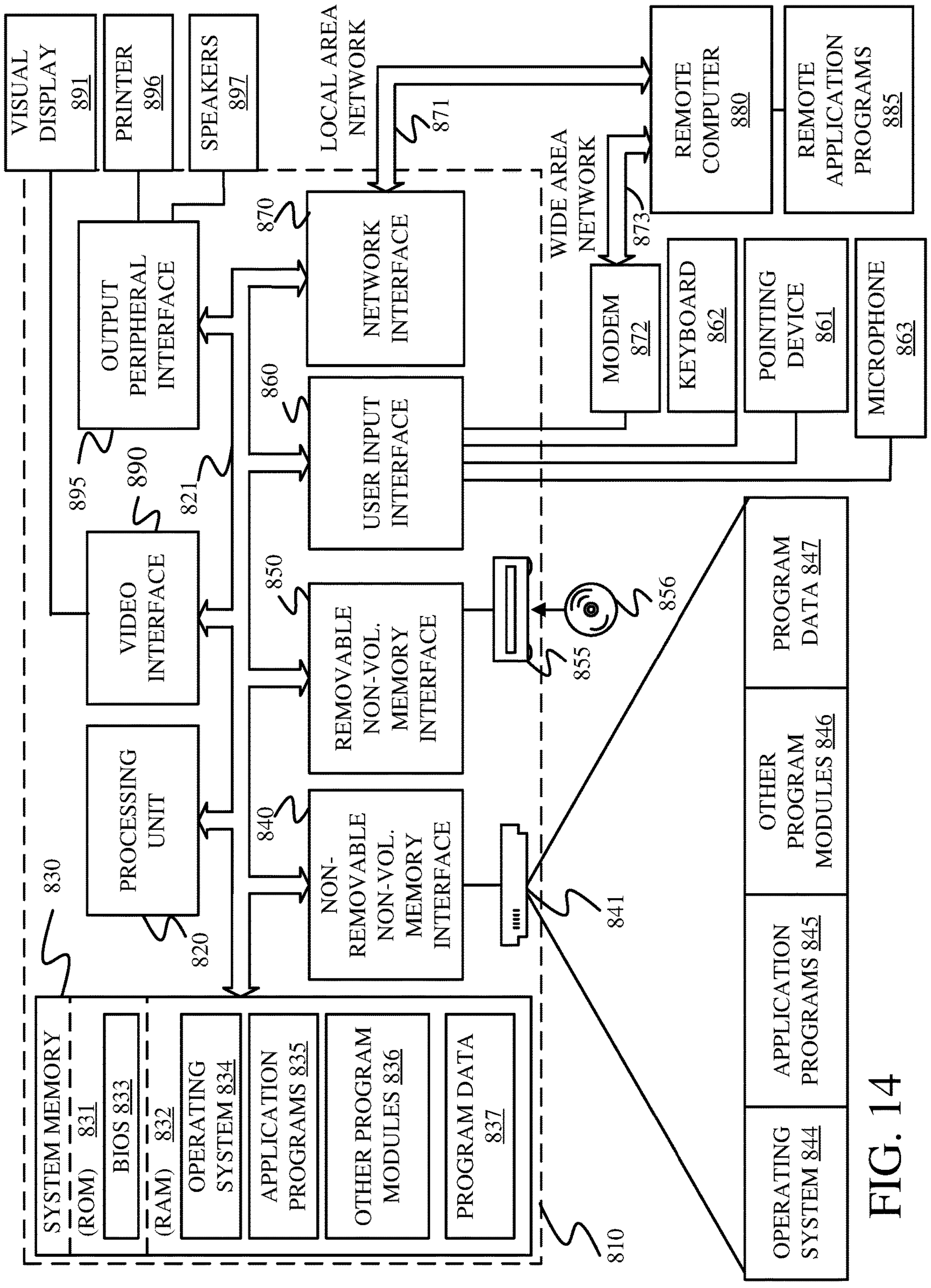
FIG. 14 is a block diagram showing one example of a computing environment that can be used in the machines and systems described with respect to previous figures.

FIG. 14 is one example of a computing environment in which elements of FIG. 4, or parts of it, (for example) can be deployed. With reference to FIG. 14, an example system for implementing some embodiments includes a computing device in the form of a computer 810 programmed to operate as discussed above. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different example described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A work machine system including a leading vehicle configured to unload material into a receiving vehicle during an unloading operation, the receiving vehicle being configured to be propelled by a following vehicle, the work machine system comprising:

- a receiving vehicle sensor mounted to the leading vehicle, the receiving vehicle sensor being configured to detect a receiving vehicle reference point and generate a sensor signal responsive to the detected receiving vehicle reference point, wherein the receiving vehicle reference point comprises a structural portion of the receiving vehicle;
- at least one processor; and
- memory storing instructions executable by the at least one processor, wherein the instructions, when executed, cause the work machine system to:
  - identify a first offset value that is indicative of a location of the receiving vehicle reference point relative to a first reference point on the leading vehicle;
  - identify a second offset value that is indicative of a location of a second reference point on the following vehicle relative to the first reference point on the leading vehicle;
  - determine, based on the first offset value and the second offset value, a relative location of the receiving vehicle reference point relative to the second reference point on the following vehicle;
  - calculate a calibrated offset value based on the relative location of the receiving vehicle reference point;
  - obtain a following vehicle position signal indicative of a position of the following vehicle relative to the leading vehicle;
  - determine a position of the receiving vehicle based on the calibrated offset value and the following vehicle position signal; and
  - control the unloading operation based on the relative location of the receiving vehicle reference point relative to the second reference point on the following vehicle.

2. The work machine system of claim 1 wherein the following vehicle and the receiving vehicle comprise a following vehicle/receiving vehicle pair and wherein the instructions, when executed, cause the work machine system to:

- output the calibrated offset value corresponding to the following vehicle/receiving vehicle pair for storage in a data store.

3. The work machine system of claim 2 wherein the instructions, when executed, cause the work machine system to:

- identify the following vehicle/receiving vehicle pair and obtain, from the data store, the calibrated offset value corresponding to the identified following vehicle/receiving vehicle pair.

4. The work machine system of claim 3 wherein the instructions, when executed, cause the work machine system to:

- obtain a following vehicle position signal indicative of a position of the following vehicle relative to the leading vehicle and to determine a position of the receiving vehicle based on the calibrated offset value obtained from the data store and the following vehicle position signal.

5. The work machine system of claim 1 wherein the instructions, when executed, cause the work machine system to:

- generate an operator prompt on an operator interface on the leading vehicle, the operator prompt prompting an operator to position the receiving vehicle relative to the leading vehicle so the receiving vehicle sensor can detect the receiving vehicle reference point.

6. The work machine system of claim 1 wherein

- the receiving vehicle sensor comprises:
  - an optical sensor configured to capture an image of a portion of the receiving vehicle; and
  - an image processor configured to identify a location of the receiving vehicle reference point in the captured image; and
- the instructions, when executed, cause the work machine system to obtain a location and orientation of the optical sensor on the leading vehicle and to identify the first offset value based on the location of the receiving vehicle reference point in the captured image and based on the location and orientation of the optical sensor on the leading vehicle.

7. The work machine system of claim 1, wherein the structural portion of the receiving vehicle comprises a boundary of a receiving area of the receiving vehicle.

8. The work machine system of claim 1, wherein the instructions, when executed, cause the work machine system to:

- obtain a first vehicle location based on a location of a position sensor on the following vehicle and a second vehicle location based on a location of a position sensor on the leading vehicle and identify, as the calibrated offset value, a location of the receiving vehicle reference point relative to the location of the position sensor on the following vehicle based on the first offset value, the first vehicle location, and the second vehicle location.

9. The work machine system of claim 1 wherein the receiving vehicle sensor comprises at least one of:

a RADAR sensor, or a LIDAR sensor.

10. The work machine system of claim 1 wherein the instructions, when executed, cause the work machine system to:

display an image of the receiving vehicle; and detect operator interaction with the image of the receiving vehicle, the operator interaction identifying the receiving vehicle reference point in the image of the receiving vehicle.

11. A computer implemented method of controlling an unloading operation for unloading material from a leading vehicle into a receiving vehicle that is propelled by a following vehicle, the computer implemented method comprising:

detecting a receiving vehicle reference point with a receiving vehicle sensor on the leading vehicle, wherein the receiving vehicle reference point comprises a structural portion of the receiving vehicle;

identifying a first offset value that is indicative of a location of the receiving vehicle reference point relative to a first reference point on the leading vehicle;

identifying a second offset value that is indicative of a location of a second reference point on the following vehicle relative to the first reference point on the leading vehicle;

determining, based on the first offset value and the second offset value, a relative location of the receiving vehicle reference point relative to the second reference point on the following vehicle;

calculating a calibrated offset value based on the relative location of the receiving vehicle reference point;

obtaining a following vehicle position signal indicative of a position of the following vehicle relative to the leading vehicle;

determining a position of the receiving vehicle based on the calibrated offset value and the following vehicle position signal; and controlling the unloading operation based on the relative location of the receiving vehicle reference point relative to the second reference point on the following vehicle.

12. The computer implemented method of claim 11 wherein detecting the receiving vehicle reference point comprises:

displaying an image of the receiving vehicle on an operator display device;

detecting an operator interaction with the image of the receiving vehicle; and identifying the receiving vehicle reference point in the image based on the detected operator interaction.

13. The computer implemented method of claim 11 wherein the following vehicle and the receiving vehicle comprise a following vehicle/receiving vehicle pair and further comprising:

outputting the calibrated offset value corresponding to the following vehicle/receiving vehicle pair for storage in a data store.

14. The computer implemented method of claim 11 and further comprising:

generating an operator prompt on an operator interface on the leading vehicle, the operator prompt prompting an operator to position the receiving vehicle relative to the leading vehicle so the receiving vehicle sensor can detect the receiving vehicle reference point.

15. The computer implemented method of claim 11 wherein detecting the receiving vehicle reference point comprises:

capturing an image of a portion of the receiving vehicle with an optical sensor; and automatically identifying a location of the receiving vehicle reference point in the captured image.

16. The computer implemented method of claim 15 wherein identifying the first offset value comprises:

obtaining a location and orientation of the optical sensor on the leading vehicle; and identifying the first offset value based on the location of the receiving vehicle reference point in the captured image and based on the location and orientation of the optical sensor on the leading vehicle.

17. The computer implemented method of claim 16 wherein identifying the calibrated offset value comprises:

obtaining a first vehicle location based on a location of a position sensor on the following vehicle;

obtaining a second vehicle location based on a location of a position sensor on the leading vehicle; and identifying, as the calibrated offset value, a location of the receiving vehicle reference point relative to the location of the position sensor on the following vehicle based on the first offset value, the first vehicle location, and the second vehicle location.

18. A control system comprising:

at least one processor; and instructions executable by the at least one processor, wherein the instructions, when executed, provide:

a leading vehicle reference locator system configured to receive a sensor signal indicative a receiving vehicle reference point and to identify a first offset value that is indicative of a location of the receiving vehicle reference point relative to a first reference point on a leading vehicle that is configured to perform an unloading operation to unload material into a receiving vehicle propelled by a following vehicle, wherein the receiving vehicle reference point comprises a structural portion of the receiving vehicle;

a following vehicle reference locator system configured to identify a second offset value that is indicative of a location of a second reference point on the following vehicle relative to the first reference point on the leading vehicle; and a receiving vehicle reference point locator system configured to:

determine, based on the first offset value and the second offset value, a relative location of the receiving vehicle reference point relative to the second reference point on the following vehicle;

calculate a calibrated offset value based on the relative location of the receiving vehicle reference point;

obtain a following vehicle position signal indicative of a position of the following vehicle relative to the leading vehicle; and determine a position of the receiving vehicle based on the calibrated offset value and the following vehicle position signal; and an unloading control system configured to control the unloading operation based on the relative location of the receiving vehicle reference point relative to the second reference point on the following vehicle.

19. The control system of claim 18 wherein the instructions, when executed, generate an operator prompt on an operator interface on the leading vehicle, the operator prompt prompting an operator to position the receiving vehicle relative to the leading vehicle so a receiving vehicle sensor can detect the receiving vehicle reference point.

20. The control system of claim 18, wherein the structural portion of the receiving vehicle comprises a boundary of a receiving area of the receiving vehicle.

* * * * *